US011804887B2

(12) United States Patent
Zeng et al.

(10) Patent No.: US 11,804,887 B2
(45) Date of Patent: Oct. 31, 2023

(54) ONLINE ADJUSTMENT FOR CHANNEL STATE INFORMATION

(71) Applicant: QUALCOMM Incorporated, San Diego, CA (US)

(72) Inventors: Weiliang Zeng, San Diego, CA (US); Pouriya Sadeghi, San Diego, CA (US); Supratik Bhattacharjee, San Diego, CA (US); Sanaz Barghi, Carlsbad, CA (US); Navin Dunichand Anwani, Gondia (IN); Gautham Hariharan, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/306,890

(22) Filed: May 3, 2021

(65) Prior Publication Data

US 2022/0352955 A1 Nov. 3, 2022

(51) Int. Cl.
*H04B 7/06* (2006.01)
*H04L 1/00* (2006.01)
*G06N 20/00* (2019.01)

(52) U.S. Cl.
CPC ......... *H04B 7/0641* (2013.01); *H04B 7/0626* (2013.01); *H04L 1/0003* (2013.01); *G06N 20/00* (2019.01)

(58) Field of Classification Search
CPC ... H04B 7/0641; H04B 7/0626; H04L 1/0003; G06N 20/00
See application file for complete search history.

(56) References Cited

U.S. PATENT DOCUMENTS

| 2018/0198548 A1* | 7/2018 | Nammi | .............. H04L 27/2657 |
| 2018/0234204 A1* | 8/2018 | Nammi | .............. H04L 1/0003 |
| 2018/0324815 A1* | 11/2018 | Nammi | .............. H04L 5/0057 |

(Continued)

FOREIGN PATENT DOCUMENTS

| EP | 3836467 A1 | 6/2021 | |
| WO | WO-2015165514 A1 * | 11/2015 | ........... H04L 1/0031 |

(Continued)

OTHER PUBLICATIONS

International Search Report and Written Opinion—PCT/US2022/071123—ISA/EPO—dated Jun. 24, 2022.

*Primary Examiner* — Wei Zhao
(74) *Attorney, Agent, or Firm* — Holland & Hart / Qualcomm

(57) ABSTRACT

Methods, systems, and devices for wireless communications are described. A user equipment (UE) may receive a set of reference signals from a base station and may determine a first set of channel state parameters. The UE may determine one or more preprocessed decoder parameters based on a downlink channel decoder of the UE and may perform one or more signal processing operations to determine one or more adjustment values for the first set of channel state parameters. The UE may transmit an indication of a the one or more adjustment values to the base station. In some implementations, the UE may transmit an indication of the one or more preprocessed decoder parameters to the base station and the base station may perform the one or more signal processing operations to determine the one or more adjustment values.

28 Claims, 20 Drawing Sheets

(56) References Cited

U.S. PATENT DOCUMENTS

| | | | |
|---|---|---|---|
| 2020/0127901 A1* | 4/2020 | Hariharan | H04B 17/336 |
| 2020/0267524 A1* | 8/2020 | Fliess | H04W 72/14 |
| 2020/0383119 A1* | 12/2020 | Sun | H04L 5/0053 |
| 2021/0091838 A1 | 3/2021 | Bai et al. | |
| 2022/0149904 A1* | 5/2022 | Timo | H04W 72/042 |

FOREIGN PATENT DOCUMENTS

| | | |
|---|---|---|
| WO | WO-2020030178 A1 | 2/2020 |
| WO | WO-2020213964 A1 | 10/2020 |

* cited by examiner

ONLINE ADJUSTMENT FOR CHANNEL STATE INFORMATION

TECHNICAL FIELD

This disclosure relates generally to wireless communications, and more specifically, to online adjustment for channel state information.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station and a UE may utilize channel state information (CSI) to communicate information relating to wireless link adaptation. For example, the UE may receive a reference signal (such as a channel state information reference signal (CSI-RS)) from the base station and, based on measuring the CSI-RS, may report CSI to the base station. The base station may adjust one or more channel state parameters to adapt to channel conditions indicated by the CSI report. In some cases, the wireless link adaptation may be controlled by the base station via outer loop driving by reporting, as part of the CSI, acknowledgement (ACK) and negative acknowledgement (NACK) feedback. In some examples, however, reporting the ACK/NACK feedback in this way may delay accurate link adaptation. For example, the UE may not be capable of providing real-time ACK/NACK feedback for bursty traffic or the ACK/NACK feedback may be mismatched with actual UE performance, such as receiver performance. Thus, reporting the ACK/NACK feedback in this way may result in increased latency or inaccurate reporting, which may in turn reduce throughput and degrade communications performance, among other disadvantages.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communication. The method includes receiving, from a base station, one or more channel state information (CSI) reference signals (CSI-RSs) for a downlink channel, measuring one or more first channel state parameters of the one or more channel state information reference signals, detecting, from a downlink channel decoder, one or more preprocessed decoder parameters associated with a downlink transmission received on the downlink channel, determining, using one or more signal processing operations and based on the one or more preprocessed decoder parameters, one or more adjustment values for the one or more first channel state parameters, and transmitting, to the base station, the one or more second channel state parameters including the one or more adjustment values for the one or more first channel state parameters.

Another innovative aspect of the subject matter described in this disclosure can be implemented in an apparatus for wireless communication. The apparatus includes a processor, memory coupled with the processor, and instructions stored in the memory. The instructions may be executable by the processor to cause the apparatus to receive, from a base station, one or more CSI-RSs for a downlink channel, measure one or more first channel state parameters of the one or more channel state information reference signals, detecting, from a downlink channel decoder, one or more preprocessed decoder parameters associate with a downlink transmission received on the downlink channel, determine, using one or more signal processing operations and based on the one or more preprocessed decoder parameters, one or more adjustment values for the one or more first channel state parameters, and transmit, to the base station, the one or more second channel state parameters including the one or more adjustment values for the one or more first channel state parameters.

Another innovative aspect of the subject matter described in this disclosure can be implemented in an apparatus for wireless communication. The apparatus includes means for receiving, from a base station, one or more CSI-RSs for a downlink channel, means for measuring one or more first channel state parameters of the one or more channel state information reference signals, means for detecting, from a downlink channel decoder, one or more preprocessed decoder parameters associated with a downlink transmission received on the downlink channel, means for determining, using one or more signal processing operations and based on the one or more preprocessed decoder parameters, one or more adjustment values for the one or more first channel state parameters, and means for transmitting, to the base station, the one or more second channel state parameters including the one or more adjustment values for the one or more first channel state parameters.

Another innovative aspect of the subject matter described in this disclosure can be implemented in a non-transitory computer-readable medium for wireless communication. The method includes instructions executable by a processor to receive, from a base station, one or more CSI-RSs for a downlink channel, measure one or more first channel state parameters of the one or more channel state information reference signals, detecting, from a downlink channel decoder, one or more preprocessed decoder parameters associate with a downlink transmission received on the downlink channel, determine, using one or more signal processing operations and based on the one or more preprocessed decoder parameters, one or more adjustment values for the one or more first channel state parameters, and transmit, to the base station, the one or more second channel state parameters including the one or more adjustment values for the one or more first channel state parameters.

In some examples of the method, apparatuses, and non-transitory computer-readable medium described herein, determining the one or more adjustment values may include operations, features, means, or instructions for determining, using a first signal processing operation, that the one or more first channel state parameters may be adjusted to improve throughput based on the one or more preprocessed decoder parameters and determining, using a second signal processing operation, the one or more adjustment values for the one or more first channel state parameters.

In some examples of the method, apparatuses, and non-transitory computer-readable medium described herein, the first signal processing operation may be a first machine learning operation, and the second signal processing operation may be a second machine learning operation.

In some examples of the method, apparatuses, and non-transitory computer-readable medium described herein, determining that the one or more first channel state parameters should be adjusted includes using a machine learning operation implemented by a neural network operation to determine that a modulation and coding scheme (MCS) that may be higher than a granted MCS associated with the downlink transmission passes a cyclic redundancy check (CRC).

In some examples of the method, apparatuses, and non-transitory computer-readable medium described herein, determining the one or more adjustment values includes using a machine learning operation implemented by an online iterative process to calculate one or more expected spectral efficiency values for one or more respective MCSs associated with the downlink transmission.

In some examples of the method, apparatuses, and non-transitory computer-readable medium described herein, determining the one or more adjustment values includes setting a target spectrum efficiency based on the one or more respective modulation and coding schemes, and the one or more respective MCSs include a granted MCS, an MCS that may be lower than the granted MCS, and an MCS that may be higher than the granted MCS.

Another innovative aspect of the subject matter described in this disclosure can be implemented in a method for wireless communication. The method includes receiving, from a UE, one or more sounding reference signals (SRSs) for an uplink channel, measuring one or more first channel state parameters of the one or more SRSs, decoding one or more uplink transmissions received from the UE, determining, using one or more signal processing operations and based on one or more preprocessed decoder parameters, one or more adjustment values for the one or more first channel state parameters, and transmitting, to the UE, the one or more second channel state parameters including the one or more adjustment values for the one or more first channel state parameters.

Another innovative aspect of the subject matter described in this disclosure can be implemented in an apparatus for wireless communication. The apparatus includes a processor, memory coupled with the processor, and instructions stored in the memory. The instructions may be executable by the processor to cause the apparatus to receive, from a UE, one or more SRSs for an uplink channel, measure one or more first channel state parameters of the one or more SRSs, decode one or more uplink transmissions received from the UE, determine, using one or more signal processing operations and based on one or more preprocessed decoder parameters, one or more adjustment values for the one or more first channel state parameters, and transmit, to the UE, the one or more adjustment values for the one or more first channel state parameters.

Another innovative aspect of the subject matter described in this disclosure can be implemented in an apparatus for wireless communication. The apparatus includes means for receiving, from a UE, one or more SRSs for an uplink channel, means for measuring one or more first channel state parameters of the one or more SRSs, means for decoding one or more uplink transmissions received from the UE, means for determining, using one or more signal processing operations and based on one or more preprocessed decoder parameters, one or more adjustment values for the one or more first channel state parameters, and means for transmitting, to the UE, the one or more adjustment values for the one or more first channel state parameters.

Another innovative aspect of the subject matter described in this disclosure can be implemented in a non-transitory computer-readable medium for wireless communication. The code includes instructions executable by a processor to receive, from a UE, one or more SRSs for an uplink channel, measure one or more first channel state parameters of the one or more SRSs, decode one or more uplink transmissions received from the UE, determine, using one or more signal processing operations and based on one or more preprocessed decoder parameters, one or more adjustment values for the one or more first channel state parameters, and transmit, to the UE, the one or more adjustment values for the one or more first channel state parameters.

In some examples of the method, apparatuses, and non-transitory computer-readable medium described herein, determining the one or more adjustment values may include operations, features, means, or instructions for determining, using a first signal processing operation, that the one or more first channel state parameters can be adjusted to improve throughput based on the one or more preprocessed decoder parameters and determining, using a second signal processing operation, the one or more adjustment values for the one or more first channel state parameters.

Another innovative aspect of the subject matter described in this disclosure can be implemented in a method for wireless communication. The method includes determining one or more channel state parameters associated with one or more reference signals communicated over a channel, detecting, from a downlink channel decoder, one or more preprocessed decoder parameters associated with communication over the channel, and transmitting, to a base station, a message including an indication of the one or more preprocessed decoder parameters based on determining the one or more channel state parameters and detecting the one or more preprocessed decoder parameters.

Another innovative aspect of the subject matter described in this disclosure can be implemented in an apparatus for wireless communication. The apparatus includes a processor, memory coupled with the processor, and instructions stored in the memory. The instructions may be executable by the processor to cause the apparatus to determine one or more channel state parameters associated with one or more reference signals communicated over a channel, detecting, from a downlink channel decoder, one or more preprocessed decoder parameters associate with communication over the channel, and transmit, to a base station, a message including an indication of the one or more preprocessed decoder parameters based on determining the one or more channel state parameters and detecting the one or more preprocessed decoder parameters.

Another innovative aspect of the subject matter described in this disclosure can be implemented in an apparatus for wireless communication. The apparatus includes means for determining one or more channel state parameters associated with one or more reference signals communicated over a channel, means for detecting, from a downlink channel decoder, one or more preprocessed decoder parameters associated with communication over the channel, and means for transmitting, to a base station, a message including an indication of the one or more preprocessed decoder parameters based on determining the one or more channel state parameters and detecting the one or more preprocessed decoder parameters.

Another innovative aspect of the subject matter described in this disclosure can be implemented in a non-transitory computer-readable medium for wireless communication. The code includes instructions executable by a processor to determine one or more channel state parameters associated with one or more reference signals communicated over a channel, detecting, from a downlink channel decoder, one or more preprocessed decoder parameters associate with communication over the channel, and transmit, to a base station, a message including an indication of the one or more preprocessed decoder parameters based on determining the one or more channel state parameters and detecting the one or more preprocessed decoder parameters.

Some examples of the method, apparatuses, and non-transitory computer-readable medium described herein may further include operations, features, means, or instructions for determining, using one or more signal processing operations, that the one or more channel state parameters can be adjusted to improve throughput based on the one or more preprocessed decoder parameters, where transmitting the message includes transmitting an indication of the determining.

Another innovative aspect of the subject matter described in this disclosure can be implemented in a method for wireless communication. The method includes determining one or more channel state parameters associated with one or more reference signals communicated over a channel, receiving, from a UE, a message including an indication of one or more preprocessed decoder parameters associated with a downlink channel decoder of the UE, determining, based on the indication of the one or more preprocessed decoder parameters, one or more adjustment values associated with the one or more channel state parameters, and transmitting, to the UE, a downlink transmission based on the one or more adjustment values associated with the one or more channel state parameters.

Another innovative aspect of the subject matter described in this disclosure can be implemented in an apparatus for wireless communication. The apparatus includes a processor, memory coupled with the processor, and instructions stored in the memory. The instructions may be executable by the processor to cause the apparatus to determine one or more channel state parameters associated with one or more reference signals communicated over a channel, receive, from a UE, a message including an indication of one or more preprocessed decoder parameters associated with a downlink channel decoder of the UE, determine, based on the indication of the one or more preprocessed decoder parameters, one or more adjustment values associated with the one or more channel state parameters, and transmit, to the UE, a downlink transmission based on the one or more adjustment values associated with the one or more channel state parameters.

Another innovative aspect of the subject matter described in this disclosure can be implemented in an apparatus for wireless communication. The apparatus includes means for determining one or more channel state parameters associated with one or more reference signals communicated over a channel, means for receiving, from a UE, a message including an indication of one or more preprocessed decoder parameters associated with a downlink channel decoder of the UE, means for determining, based on the indication of the one or more preprocessed decoder parameters, one or more adjustment values associated with the one or more channel state parameters, and means for transmitting, to the UE, a downlink transmission based on the one or more adjustment values associated with the one or more channel state parameters.

Another innovative aspect of the subject matter described in this disclosure can be implemented in a non-transitory computer-readable medium for wireless communication. The code includes instructions executable by a processor to determine one or more channel state parameters associated with one or more reference signals communicated over a channel, receive, from a UE, a message including an indication of one or more preprocessed decoder parameters associated with a downlink channel decoder of the UE, determine, based on the indication of the one or more preprocessed decoder parameters, one or more adjustment values associated with the one or more channel state parameters, and transmit, to the UE, a downlink transmission based on the one or more adjustment values associated with the one or more channel state parameters.

In some examples of the method, apparatuses, and non-transitory computer-readable medium described herein, determining the one or more adjustment values associated with the one or more channel state parameters includes using one or more signal processing operations, and the downlink transmission may be based on one or more second channel state parameters for the one or more reference signals, the one or more second channel state parameters including the one or more adjustment values associated with the one or more channel state parameters.

In some examples of the method, apparatuses, and non-transitory computer-readable medium described herein, determining the one or more adjustment values may include operations, features, means, or instructions for determining, using a first signal processing operation, that the one or more channel state parameters can be adjusted to improve throughput based on the one or more preprocessed decoder parameters and determining, using a second signal processing operation, the one or more adjustment values associated with the one or more channel state parameters.

DETAILED DESCRIPTION

Figure 1:
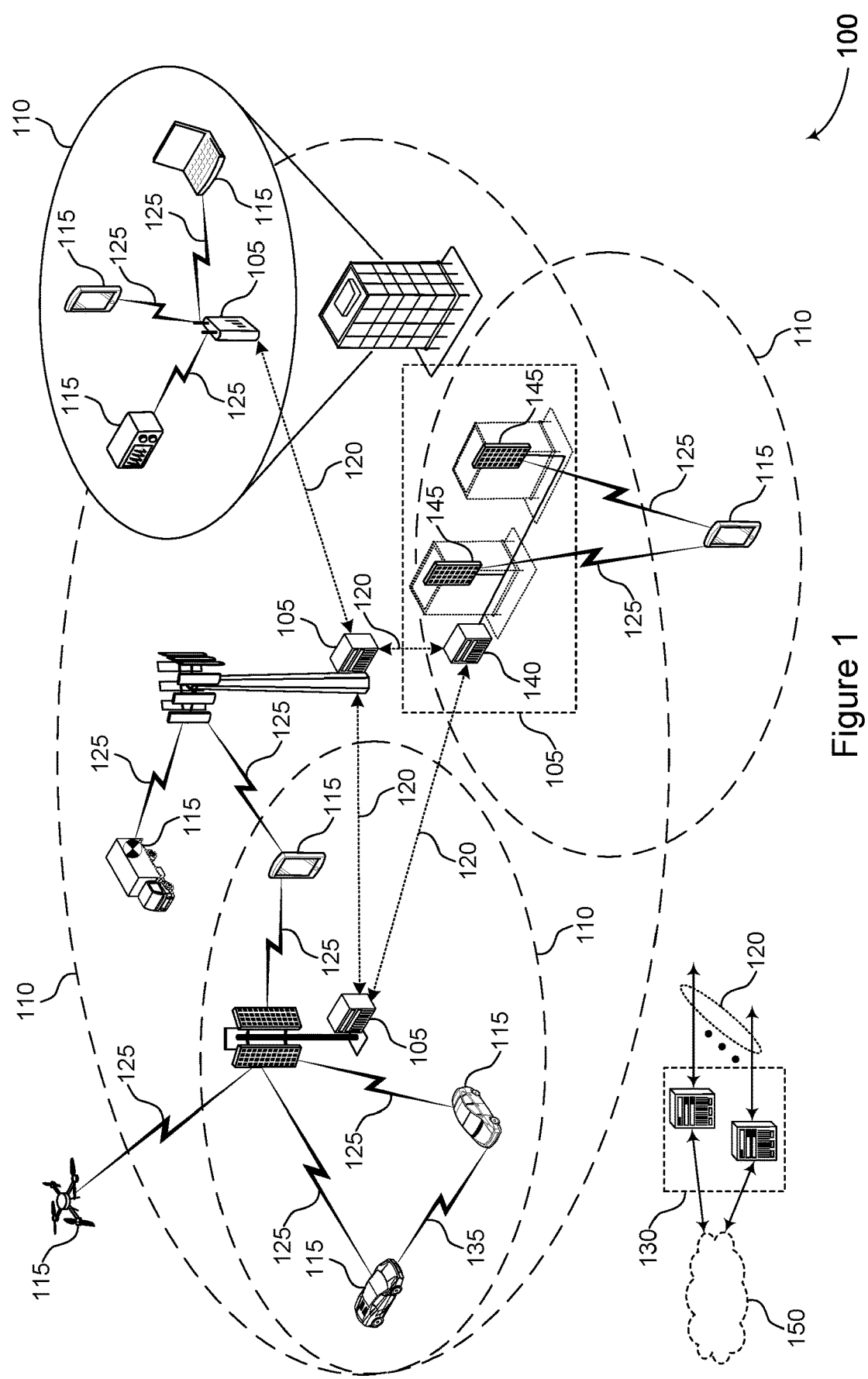
FIGS. 1 and 2 illustrate examples of wireless communication systems that supports online adjustment for channel state information (CSI) in accordance with aspects of the present disclosure.

The described techniques relate to methods, systems, devices, and apparatuses that support online adjustment for channel state information (CSI). Generally, the described techniques provide for a wireless device, such as a base station or a user equipment (UE), to receive and measure reference signals, to determine channel state parameters, and to perform signal processing operations to calculate adjustments for at least some of the channel state parameters, for example, based on information associated with data transmissions over a channel. For example, the UE may receive a CSI reference signal (CSI-RS) from the base station and may measure channel state parameters. The UE may obtain information, for example from a downlink channel decoder used to decode a data transmission received over a downlink channel, and may preprocess the information by applying computational methods, data analysis procedures, feature extraction, imputations, or any combination thereof to derive preprocessed decoder parameters. The UE may use the preprocessed decoder parameters to determine if the channel state parameters may be adjusted, for example, to improve accuracy of a CSI report and throughput of an associated channel based on the channel state parameters. In some aspects, the UE may perform signal processing operations to determine adjustment values for the channel state parameters and may transmit an indication of the adjustment values for the channel state parameters to the base station. The base station may adapt subsequent transmissions to the UE based on the adjustment values for the channel state parameters.

In some other aspects, the base station may perform signal processing to determine adjustment values for the channel state parameters. For example, the UE may transmit an indication of the preprocessed decoder parameters, and the base station may determine the adjustment values using the preprocessed decoder parameters. Additionally, or alternatively, the UE may transmit, to the base station, a sounding reference signal (SRS), and the channel state parameters may be determined by the base station (for example, based on the SRS). In such implementations, the base station may determine adjustment values for the channel state parameters (for example, based on preprocessed decoder parameters indicated by the UE) and may transmit an indication of the adjustment values to the UE.

In some examples, the signal processing operations may include or may be examples of machine learning operations. For example, the UE may provide the preprocessed decoder parameters or other parameters (such as, a granted modulation and coding scheme (MCS) or a rank, among other examples) associated with the data transmission (or both) to an input layer of a neural network (NN). The NN may predict or otherwise determine, for example, the likelihood that a non-granted MCS that is different than the granted MCS may pass a cyclic redundancy check (CRC), which may indicate that the channel state parameters may be improved. Based on the prediction, the UE may estimate expected spectral efficiencies associated with the non-granted MCS and may use the expected spectral efficiencies as inputs to an online iterative process. The UE may perform the online iterative process, which may include machine learning operations, to determine the adjustment values for the channel state parameters.

Various aspects generally relate to link adaptation within wireless communications systems, and more specifically, to accurate CSI reporting using adjusted channel state parameters and online adjustment. Various aspects relate to a wireless device utilizing channel state parameters calculated from one or more reference signals, as well as preprocessed parameters derived from a downlink channel decoder, to determine adjustment values for the channel state parameters using one or more signal processing operations. The wireless device may transmit an indication of the adjustment values. In some instances, a first signal processing operation may be an example of a machine learning operation and may utilize at least the channel state parameters and the preprocessed decoder information to determine that the channel state parameters may be adjusted. Based on the determining, a second signal processing operation, which may be an example of a second machine learning operation, may be used to iteratively compute adjustment values for the channel state parameters.

Particular aspects of the subject matter described in this disclosure may be implemented to realize one or more of the following potential advantages. The techniques employed by the described wireless devices, such as the UE or the base station or both, may provide benefits and enhancements to the operation of the wireless devices, including increased throughput over established communication links. For example, operations performed by the described wireless devices may provide improvements to link adaptation by utilizing a procedure, such as an iterative procedure, to adjust one or more channel state parameters. In some implementations, the operations performed by the described wireless devices to adjust channel state parameters may increase an accuracy in CSI reporting, thereby increasing data throughput while reducing computational complexity and minimizing retransmissions. In some implementations, the time needed to accurately estimate CSI is reduced due to leveraging of a pretrained machine learning algorithm, negating the time needed for other different algorithms to converge. In some other implementations, operations performed by the described wireless devices may also support improvements to power consumption, reliability for uplink communications and downlink communications, spectral efficiency, higher data rates and, in some examples, reduced communications latency, among other benefits.

Aspects of the disclosure are initially described in the context of wireless communications systems. Aspects of the disclosure are then described with references to an inference-based online tuning process, a data path, and process flows. Aspects of the disclosure are further illustrated by and described with reference to apparatus diagrams, system diagrams, and flowcharts that relate to online adjustment for channel state information.

FIG. 1 illustrates an example of a wireless communications system 100 that supports online adjustment for channel state information in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115-described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105-described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, in which the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115-described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode in which initial acquisition and connection may be conducted by the UEs 115 via the carrier, or the carrier may be operated in a non-standalone mode in which a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, in which a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB- IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode if not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115-communicating via D2D communications may utilize a one-to-many (1:M) system in which each UE 115 transmits to every other UE 115 in the group. In some examples, a base station 105 facilitates the scheduling of resources for D2D communications. In other examples, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. If operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) if receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, if receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other examples, the device may provide HARQ feedback in a subsequent slot, or according to some other time interval.

HARQ feedback may be used by a base station 105 or a UE 115 to perform link adaptation. For example, a UE 115 may transmit, to a base station 105, HARQ feedback indicating whether a downlink data transmission was successfully received by the UE 115. The base station 105 may adjust or adapt communication parameters based on the HARQ feedback to improve reliability of subsequent communications with the UE 115. Further link adaptation may be performed via reference signals and CSI reporting. The base station 105 may transmit, to the UE 115, one or more CSI-RSs for the UE 115 to measure. The UE 115 may transmit a CSI report to the base station 105-based on the measurements and the base station 105 may utilize the CSI report to adjust or adapt communications parameters. Additionally, or alternatively, the UE 115 may transmit, to the base station 105, sounding reference signals (SRSs) for the base station 105 to use in determining CSI and subsequent adjustments.

According to the techniques described herein, the base station 105 and the UE 115 may utilize one or more signal processing operations to adjust measured channel state parameters based on information associated with communications over a channel. The UE 115, the base station 105, or both may collect the information from a downlink channel decoder. The UE 115, the base station 105, or both may preprocess the information by applying one or more mathematical methods, one or more data analysis procedures, one or more feature extractions, one or more imputation procedures, or any combination thereof, to obtain one or more preprocessed decoder parameters. The UE 115, the base station 105, or both may use the one or more preprocessed decoder parameters to perform one or more signal processing operations to determine that the channel state parameters may be adjusted (e.g., to increase throughput of the channel) and to determine one or more adjustment values for the channel state parameters.

In some examples, the one or more signal processing operations may include or may be examples of one or more machine learning operations (for example, machine learning operations based on using machine learning algorithms). For example, the UE 115 or the base station 105 may provide the one or more preprocessed decoder parameters and the channel state parameters as inputs to a first machine learning operation to determine whether the channel state parameters may be adjusted. For example, the UE 115 may provide the inputs to an input layer of a NN. In some examples, the UE 115 may provide additional inputs based on one or more downlink transmissions received from the base station 105, such as a modulation and coding scheme (MCS) or a rank, among other examples. The NN may predict or otherwise determine the likelihood that an MCS that is relatively higher than the MCS associated with the downlink transmission may pass a cyclic redundancy check (CRC) (for example, a transport block (TB) CRC). If the NN determines that the higher MCS may pass the TB CRC, the UE 115 may determine one or more expected spectral efficiencies (SEs) for use in a second machine learning operation. For example, the UE 115 may use the one or more expected SEs as inputs to an iterative procedure, such as an online iterative procedure, performed by the UE 115 to calculate a set of adjustment values for the channel state parameters.

The UE 115 or the base station 105 may use the calculated adjustment values to determine adjusted channel state parameters. For example, the UE 115 or the base station 105 may combine the adjustment values with the measured channel state parameters to obtain adjusted channel state parameters. The UE 115 or the base station 105 may transmit an indication of the adjusted channel state parameters, the adjustment values, or both. In some examples, the base station 105 may adjust communication parameters for subsequent communications between the base station 105 and the UE 115-based on the adjusted channel state parameters or the adjustment values. For example, if the UE 115 measured channel state parameters based on a CSI-RS, the base station 105 may adjust communication parameters for a downlink channel. Additionally, or alternatively, if the base station 105 measured channel state parameters based on an SRS, the base station 105 may adjust communication parameters for an uplink channel.

Figure 2:
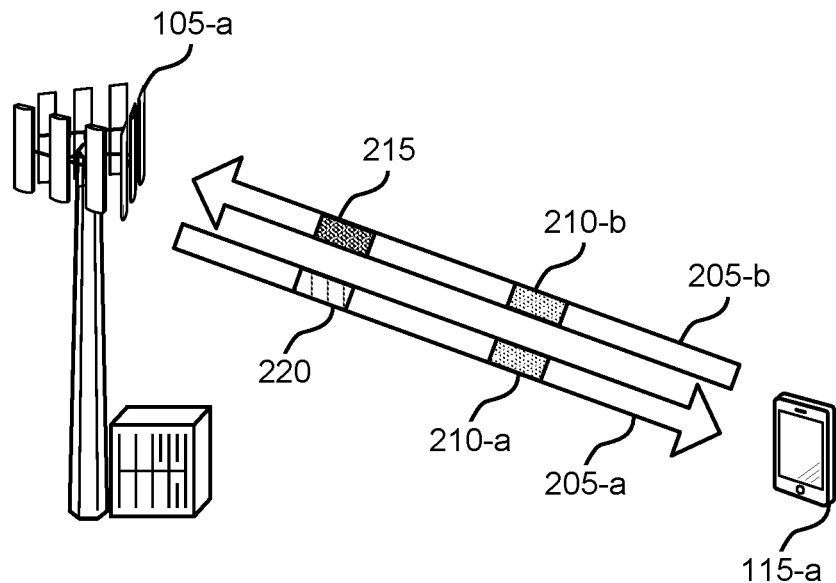

FIG. 2 illustrates an example of a wireless communications system 200 that supports online adjustment for CSI in accordance with aspects of the present disclosure. The wireless communications system 200 includes a UE 115-a and a base station 105-a, which may be examples of corresponding devices as described with reference to FIG. 1. The UE 115-a and the base station 105-a may communicate via communication links 205. In the discussion that follows with respect to FIGS. 2-8, it is important to note that, although specific examples are contemplated below, any multitude of computational techniques, including one or more signal processing operations, machine learning operations, or other examples, may be used to implement one or more aspects of the present disclosure.

The communication links 205 may include a communication link 205-a and a communication link 205-b. In some examples, the communication link 205-a may be an example of a downlink channel, such as a physical downlink shared channel (PDSCH) and the communication link 205-b may be an example of an uplink channel, such as a physical uplink shared channel (PUSCH). The base station 105-a and the UE 115-a may transmit and receive one or more reference signals 210 via the communication links 205 to aid in determining CSI, among other purposes. For example, the base station 105-a may transmit one or more reference signals 210-a, such as CSI-RSs, to the UE 115-a via the communication link 205-a. The UE 115-a may measure one or more channel state parameters of the one or more reference signals 210-a. The UE 115-a may use the one or more channel state parameters to estimate and transmit CSI information, such as a quantized CSI report. The base station 105-a may use the CSI information to perform link adaptation to improve performance for subsequent communications with the UE 115-a, for example, via the communication link 205-a (in other words, a downlink channel).

Additionally, or alternatively, the UE 115-a may transmit one or more reference signals 210-b, such as sounding reference signals (SRSs), to the base station 105-a via the communication link 205-b, and the base station 105-a may measure one or more channel state parameters of the one or more reference signals 210-b. The base station 105-a may use the one or more channel state parameters to determine and perform link adaptation for subsequent communications with the UE 115-a, for example, via the communication link 205-b (in other words, an uplink channel).

According to the techniques described in the present disclosure, the UE 115-a, the base station 105-a, or both, may utilize information related to communications over a channel (in other words, over the communication links 205) to adjust the one or more channel state parameters for improved accuracy in CSI reporting and link adaptation, which may in turn increase throughput of the associated channel(s). For example, the UE 115-a may detect (for example, determine, calculate, or derive) decoder parameters (for example, decoder soft metrics, such as a number of iterations, one or more energy metrics, one or more bit errors) from a downlink channel decoder that the UE 115-a uses to decode downlink transmissions (for example, PDSCH transmissions). The UE 115-a may preprocess the decoder parameters to obtain one or more preprocessed decoder parameters associated with a downlink transmission received on the channel. The UE 115-a may perform one or more signal processing operations based on the one or more decoder parameters to determine one or more adjustment values for the one or more channel state parameters measured by the UE 115-a.

That is, in some examples, the UE 115-a may determine information from a downlink channel (for example, in addition to information determined using the one or more reference signals 210) by determining the one or more decoder parameters, as the downlink channel decoder is used to decode a downlink transmission and may indicate channel conditions otherwise undetected by the UE 115-a. For example, the downlink channel may experience interference that does not overlap in time or frequency with the one or more reference signals 210 such that the UE 115-a may be unable to measure the interference using the one or more reference signals 210. However, the downlink channel decoder may be configured to implicitly indicate that such interference is present (for example, based on the values of the one or more preprocessed decoder parameters), and the UE 115-*a* may determine more accurate channel state parameters by adjusting the one or more channel state parameters using the one or more adjustment values and based on the one or more preprocessed decoder parameters. In some implementations, the UE 115-*a* may transmit the one or more adjustment values 215 to the base station 105-*a*. In some examples, the UE 115-*a* may determine and transmit one or more second channel state parameters to the base station 105-*a* that include the one or more adjustment values 215.

In some implementations, the one or more signal processing operations may include a first signal processing operation and a second signal processing operation, in which the first signal processing operation may be performed (for example, by the UE 115-*a* or the base station 105-*b*) to determine that the channel state parameters may be adjusted and the second signal processing operation may be performed (for example, by the UE 115-*a* or the base station 105-*a*) to calculate the one or more adjustment values for the channel state parameters. In some examples, the first signal processing operation, the second signal processing operation, or both may be examples of machine learning operations (in other words, machine learning operations based on machine learning algorithms). For example, the UE 115-*a* may perform a first machine learning operation, which may be implemented by a NN, based on the one or more preprocessed decoder parameters and to determine that the one or more channel state parameters should be adjusted, for example, to provide a more accurate reflection of the channel conditions. Additionally, or alternatively, the UE 115-*a* may perform a second machine learning operation, which may be implemented by an online iterative process in some examples, to calculate the one or more adjustment values for the one or more channel state parameters based on the one or more preprocessed decoder parameters. In some implementations, the second machine learning operation may be performed based on the outcome (in other words, the determining) of the first machine learning operation.

In some examples, the base station 105-*a* may perform the one or more signal processing operations based on the one or more decoder parameters to adjust the one or more channel state parameters determined at the base station 105-*a*. For example, the UE 115-*a* may transmit an indication of the one or more preprocessed decoder parameters to the base station 105-*a*, or the base station 105-*a* may determine the one or more preprocessed decoder parameters, for instance, based on one or more uplink transmissions received from the UE 115-*a*. The base station 105-*a* may perform the one or more signal processing operations using the one or more preprocessed decoder parameters and may determine the one or more adjustment values. The base station 105-*a* may transmit the one or more adjustment values 220 to the UE 115-*a*. In some examples, the base station may determine and transmit one or more second channel state parameters to the UE 115-*a*, where the one or more second channel state parameters may include the one or more adjustment values 220.

In some implementations, the UE 115-*a* and the base station 105-*a* may both perform one or more signal processing operations to determine the one or more adjustment values. For example, the UE 115-*a* may determine one or more channel state parameters associated with the one or more reference signals 210 (for example, one or more CSI-RSs or one or more SRSs) and may detect one or more preprocessed decoder parameters associated with a downlink channel decoder of the UE 115-*a*. The UE 115-*a* may utilize the one or more preprocessed decoder parameters to determine the accuracy of the one or more channel state parameters, for example, by performing a first signal processing operation to predict or otherwise determine that the one or more channel state parameters should be adjusted. The UE 115-*a* may transmit an indication of the one or more preprocessed decoder parameters and, in some examples, an indication of the prediction to the base station 105-*a*. Based on the one or more preprocessed decoder parameters, the indication of the prediction, or both, the base station 105-*a* may adjust the one or more channel state parameters by determining a set of adjustment values. That is, the base station 105-*a* may perform a second signal processing operation to calculate the one or more adjustment values for the one or more channel state parameters.

The one or more preprocessed decoder parameters may be determined based on or by detecting information from the downlink channel decoder and performing one or more operations to preprocess the information. For example, the UE 115-*a* may obtain downlink information from a downlink transmission received over the communication link 205-*a* and decoded by the downlink channel decoder. The information may include statistics or values classifying, for example, one or more of the combined effects of scattering, fading, and power decay (in other words, a transfer function), among other examples, corresponding to communications over the communication link 205-*a*. For example, the information may include statistical values of decoder soft metrics. The UE 115-*a* may preprocess the information by applying one or more computational methods (such as mathematical methods), one or more data analysis procedures, one or more feature extractions (for example, converting non-numerical data to numerical data), one or more imputation procedures (in other words, substitution of missing values), or any combination thereof. For example, the UE 115-*a* may perform statistical methods on the information to obtain one or more soft metrics (for example, an iteration number, an energy metric, or bit errors, among other examples) and decoder statistics corresponding to the downlink channel decoder. In some examples, the UE 115-*a* may apply one or more dimensionality reduction operations, decomposition operations, or any combination thereof to the decoder parameters. Additionally or alternatively, the UE 115-*a* may apply feature scaling techniques to the decoder parameters by rescaling the decoder parameters, shifting the decoder parameters, altering the distribution of the decoder parameters, or any combination thereof. The UE 115-*a* may obtain the one or more preprocessed decoder parameters based on performing the preprocessing.

In some examples, the UE 115-*a* may perform the preprocessing at varying levels of granularity of the downlink transmission. In other words, the UE 115-*a* may derive values and statistics at a code block (CB) level, a transport block (TB) level, or a slot level. The UE 115-*a* may therefore determine downlink channel decoder information for one or more CBs or one or more transport blocks TBs within one or more slots of the downlink transmission. Additionally or alternatively, the UE 115-*a* may calculate values and statistics for each slot of the downlink transmission. For example, the UE 115-*a* may derive values and statistics corresponding to each CB in each slot of the downlink transmission.

In some implementations, the signal processing operation performed by the UE 115-*a* or the base station 105-*a* to predict that the one or more channel state parameters may be adjusted may be implemented by an NN based on an MCS associated with the downlink transmission. For example, the UE 115-a may determine if a granted MCS associated with the downlink transmission received over the communication link 205-a passes a TB cyclic redundancy check (CRC) (in other words, the TB has no data errors). If the granted MCS passes the TB CRC, the UE 115-a may initiate the NN (which may be an example of an inference-based tuning process) based on the one or more preprocessed decoder parameters. The UE 115-a may use the set of preprocessed decoder parameters, the granted MCS, a rank of the downlink transmission, or any combination thereof as inputs to an input layer of the NN. In some examples, the NN may include static, pre-trained weights. In some examples, the NN may include pre-trained weights that may be updated at specified intervals. The NN may use an architecture with one or more nonlinear activation functions in a set of layers. For example, the NN may include one or more fully connected layers, convolutional layers, residual blocks, recurrent layers, attention mechanisms, etc. utilizing a nonlinear activation function (e.g., Leaky Rectified Linear Unit (ReLU)) for hidden layers. Additionally, the NN may utilize batch normalization preceding one or more layers.

Given the inputs, the UE 115-a may use the NN to predict whether a non-granted MCS that is relatively higher than the granted MCS can pass the TB CRC. In some examples, the prediction may be a binary classification (for example, 1 or 0, pass or fail). Specifically, the output layer of the NN may utilize a sigmoid activation function (in other words, a final output between 0 and 1). In some examples, an output from the NN below a threshold (for example, <0.5) may correspond to a prediction indicating that the higher, non-granted MCS has a relatively low likelihood of passing the TB CRC. Similarly, an output from the NN above a threshold (for example, 0.5) may correspond to a prediction indicating that the higher, non-granted MCS has a relatively high likelihood of passing the TB CRC.

It should be noted that the NN may be utilized at the UE 115-a, at the base station 105-a, or any combination thereof. For example, the UE 115-a may compute the output of the NN and, in some examples, may transmit an indication of the output to the base station 105-a via the communication link 205-b. In some other examples, the UE 115-a may transmit an indication of the one or more preprocessed decoder parameters for the base station 105-a to use in determining the output of the NN.

In some implementations, the one or more signal processing operations performed by the base station 105-a, the UE 115-a, or both to determine the one or more adjustment values (for example, the one or more adjustment values 215 or the one or more adjustment values 220) may be a machine learning operation (in other words, a machine learning algorithm) implemented by an online iterative process. In some examples, the one or more adjustment values may be determined based on the prediction, for example, if the prediction indicates that a relatively higher, non-granted MCS may likely pass the TB CRC. The UE 115-a may determine one or more expected spectral efficiencies (SEs) by estimating an SE for one or more respective MCSs associated with the downlink transmission. For example, the UE 115-a may determine an expected SE of the granted MCS; a lower MCS; and a higher MCS. Based on the expected SEs, the UE 115-a may determine a target SE, in which the target SE may be equal to a given expected SE, such as in some examples a maximum expected SE. For example, if the expected SE associated with a relatively higher MCS (for example, $E(SE_{higher})$) is greater than the expected SE associated with the relatively lower MCS (for example, $E(SE_{lower})$) and the granted MCS (for example, $E(SE_{granted})$), the expected SE associated with the relatively higher MCS is set as the value of the target SE according to Equation 1 below.

$$SE_{target} = \max(E(SE_{lower}), E(SE_{granted}), E(SE_{higher}))$$

The UE 115-a may also determine an estimated SE based on the one or more channel state parameters. The UE 115-a may use the target SE and the estimated SE as inputs to the online iterative tuning process to calculate the one or more adjustment values corresponding to the first set of channel state parameters. In some examples, the online iterative tuning process may correspond to an online gradient descent-based technique.

The online iterative tuning process may determine, from the given SEs, the one or more adjustment values. For example, the one or more adjustment values may be determined such that adjusting the one or more channel state parameters using the one or more adjustment values may provide a more accurate CSI report, thereby improving link adaptation and throughput for communications between the base station 105-a and the UE 115-a. The online iterative tuning process may perform iterative corrections given sequential inputs by returning adjustment values corresponding to the one or more channel state parameters.

If the UE 115-a performs the one or more signal processing operations to determine the one or more adjustment values, the UE 115-a may transmit, to the base station 105-a, an indication of the one or more adjustment values 215. In some examples, the UE 115-a may transmit one or more second channel state parameters including the one or more adjustment values 215 or a CSI report including the one or more adjustment values 215. The base station 105-a may adjust communication parameters for subsequent communications with the UE 115-a based on the one or more second channel state parameters, the CSI report, the one or more adjustment values 215, or some combination thereof. Alternatively, if the base station 105-a performs the one or more signal processing operations to determine the one or more adjustment values, the base station 105-a may transmit, to the UE 115-a, an indication of the one or adjustment values 220. In some examples, base station 105-a may transmit one or more second channel state parameters that may include the one or more adjustment values 220.

Although the examples illustrated in FIG. 2 discuss specific devices performing specific portions of some aspects of the present disclosure, such as the base station 105-a or the UE 115-a, it is important to note that the preceding operations are not limited to the specific devices discussed, nor are the preceding operations limited to downlink communications. For example, the base station 105-a may receive one or more SRSs from the UE 115-a over the communication link 205-b. Based on the one or more SRSs, the base station 105-a may determine a first set of channel state parameters. Additionally, the base station 105-a may receive, from the UE 115-a, an indication of the one or more preprocessed decoder parameters. Based on the first set of channel state parameters and the one or more preprocessed decoder parameters, the base station 105-a may perform the one or more signal processing operations. For example, the base station 105-a may perform a first machine learning operation and a second machine learning operation to determine one or more adjustment values for the first set of channel state parameters. The base station 105-a may indicate, to the UE 115-a, the one or more adjustment values corresponding to the first set of channel state parameters. In some examples, the base station 105-a may transmit a second set of channel state parameters, for example, associated with the one or more SRSs, to the UE 115-*a*, where the second set of channel state parameters may include the one or more adjustment values. The UE 115-*a* may utilize the adjustment values to transmit a PUSCH, for example, based on the second set of channel state parameters, to the base station 105-*a* over the communication link 205-*b*. Alternatively, the base station 105-*a* may adjust the communication link 205-*a* based on the above processes.

In other examples, the UE 115-*a* may obtain the set of preprocessed decoder parameters and perform a first signal processing operation (for example, utilizing a NN to predict if a relatively higher MCS can pass the TB CRC). Based on the first signal processing operation, the UE 115-*a* may report a prediction to the base station 105-*a* alongside the first set of channel state parameters. In some examples, the UE 115-*a* may report the prediction via a quantized report that may include a negative acknowledgement (NACK0) or a positive acknowledgement (ACK). The base station 105-*a* may perform a second signal processing operation based on the prediction to determine adjustment values corresponding to the first set of channel state parameters. The base station 105-*a* may transmit, to the UE 115-*a*, a downlink PDSCH over the communication link 205-*a* based on the adjustment values. In some examples, the UE 115-*a* may determine to transmit the first set of channel state parameters as well as the preprocessed decoder parameters directly to the base station 105-*a*, in which the base station 105-*a* may perform one or more signal processing operations to determine subsequent adjustment values corresponding to the communication link 205-*a*.

In some examples, including any of the examples above, the wireless communications system 200 may continue to iteratively adjust channel state parameters during communications (in other words, online) to improve subsequent communications throughout scheduled operations, including performing multiple adjustments over a duration. The flexibility to perform one or more signal processing operations on multiple devices within the wireless communications system 200 to perform inference-based, iterative tuning of channel state parameters may provide robust operations for low complexity, high accuracy, and low latency determination of CSI adjustments.

Figure 3:
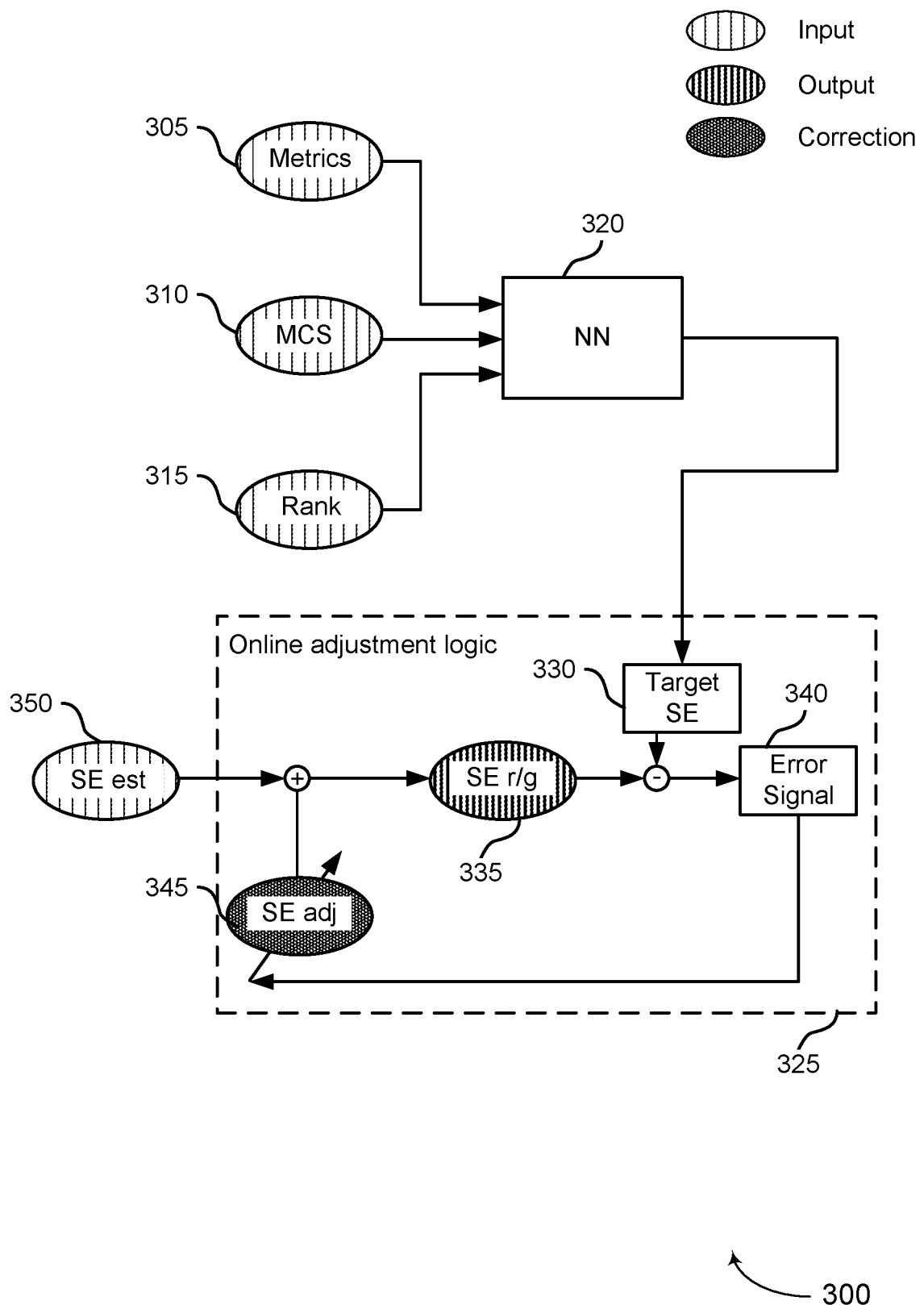
FIG. 3 illustrates an example of an inference-based online tuning process that supports online adjustment for CSI in accordance with aspects of the present disclosure.

FIG. 3 illustrates an example of an online iterative tuning process 300 that supports online adjustment for CSI in accordance with aspects of the present disclosure. In some examples, the online iterative tuning process 300 may implement or may be implemented by aspects of a wireless communications system as described with reference to FIGS. 1 and 2. For example, the online iterative tuning process 300 may be implemented by a UE 115 or a base station 105. The online iterative tuning process 300 depicts some examples of multiple signal processing techniques that accomplish one or more aspects of the present disclosure. It is important to note that any one or more signal processing techniques, including machine learning techniques, may be implemented in any combination to perform the inference-based online tuning processes.

The online iterative tuning process 300 may be implemented by a UE or a base station to determine one or more adjustment values for one or more channel state parameters, for example, as described with reference to FIG. 2. That is, the online iterative tuning process 300 may be an example of a signal processing operation (for example, a machine learning operation) performed by a UE or a base station based on one or more preprocessed decoder parameters. The online iterative tuning process 300 portrays an algorithmic diagram illustrating a particular implementation corresponding to one or more aspects discussed in the present disclosure.

The online iterative tuning process 300 may include a first signal processing operation and a second signal processing operation, in which the second signal processing operation may be gated by (for example, dependent on) a first signal processing operation. For example, a base station or a UE may use the first signal processing operation to determine or otherwise predict that the one or more channel state parameters (for example, associated with a downlink channel or an uplink channel) may be adjusted, as described with reference to FIG. 2. The first signal processing operation may include receiving a set of inputs and return a classification corresponding to the likelihood that a non-granted MCS that is relatively higher than a granted MCS associated with communications over a channel may pass a CRC. Based on the classification returned by the first signal processing operation, the base station or the UE may perform the second signal processing operation to conduct an error-based correction calculation to return one or more adjustment values for the one or more channel state parameters.

The inputs may include a set of preprocessed data 305 (for example, decoder metrics, such as preprocessed decoder parameters), a granted MCS 310, and a rank 315, and the first signal processing operation may correspond to an NN 320. The set of inputs may be provided to an input layer of the NN 320. The NN 320 may compute a classification corresponding to the set of inputs based on pretrained weight matrices within the layers of the NN (for example, the input layer, one or more hidden layers, and an output layer). The classification corresponding to the NN 320 may dictate whether the second signal processing operation is performed. For example, the NN 320 may, in some examples, utilize a binary output to indicate whether the second signal processing operation may be utilized. In other words, if the NN 320 determines or otherwise predicts that the one or more channel state parameters should be adjusted, the second signal processing operation may be initiated.

If the NN 320 determines (for example, indicates) that the relatively higher, non-granted MCS may pass the TB CRC (in other words, that the one or more channel state parameters should be adjusted), the base station or the UE may perform the second signal processing operation to conduct online iterative error correction based on a set of expected SEs. Specifically, the second machine learning operation may implement an online adjustment logic 325 to drive iterative error corrections using given inputs and measurements. For example, the online adjustment logic 325 may utilize a computed target SE 330 and the reported SE 335 (in other words, the SE associated with the granted MCS) to compute an error signal 340 characterizing the difference between them. From the error signal 340, the online adjustment logic 325 may indicate a set of adjustment values 345 for the one or more channel state parameters.

In some implementations, the base station or the UE may determine one or more second channel state parameters based on the set of adjustment values 345 and the one or more channel state parameters. For example, the UE or the base station may combine the set of adjustment values 345 with an estimated SE 350 to produce the one or more second channel state parameters, in which the estimated SE 350 is determined based on the one or more channel state parameters.

In some examples, a second set of inputs may be provided to the NN 320 to further refine the one or more second channel state parameters. In other words, the one or more second channel state parameters derived from the adjustment values 345 may yield the second set of inputs that may, in turn, drive a second iteration through the online iterative tuning process 300. The second iteration may yield a second set of adjustment values that may in turn result in a third iteration, and so forth. A feedback loop may result from the online iterative tuning process 300 that may continually and autonomously improve channel quality in the wireless communications system until a criteria is met (for example, until the error signal 340 is smaller than a predetermined threshold for a given time duration).

Figure 4:
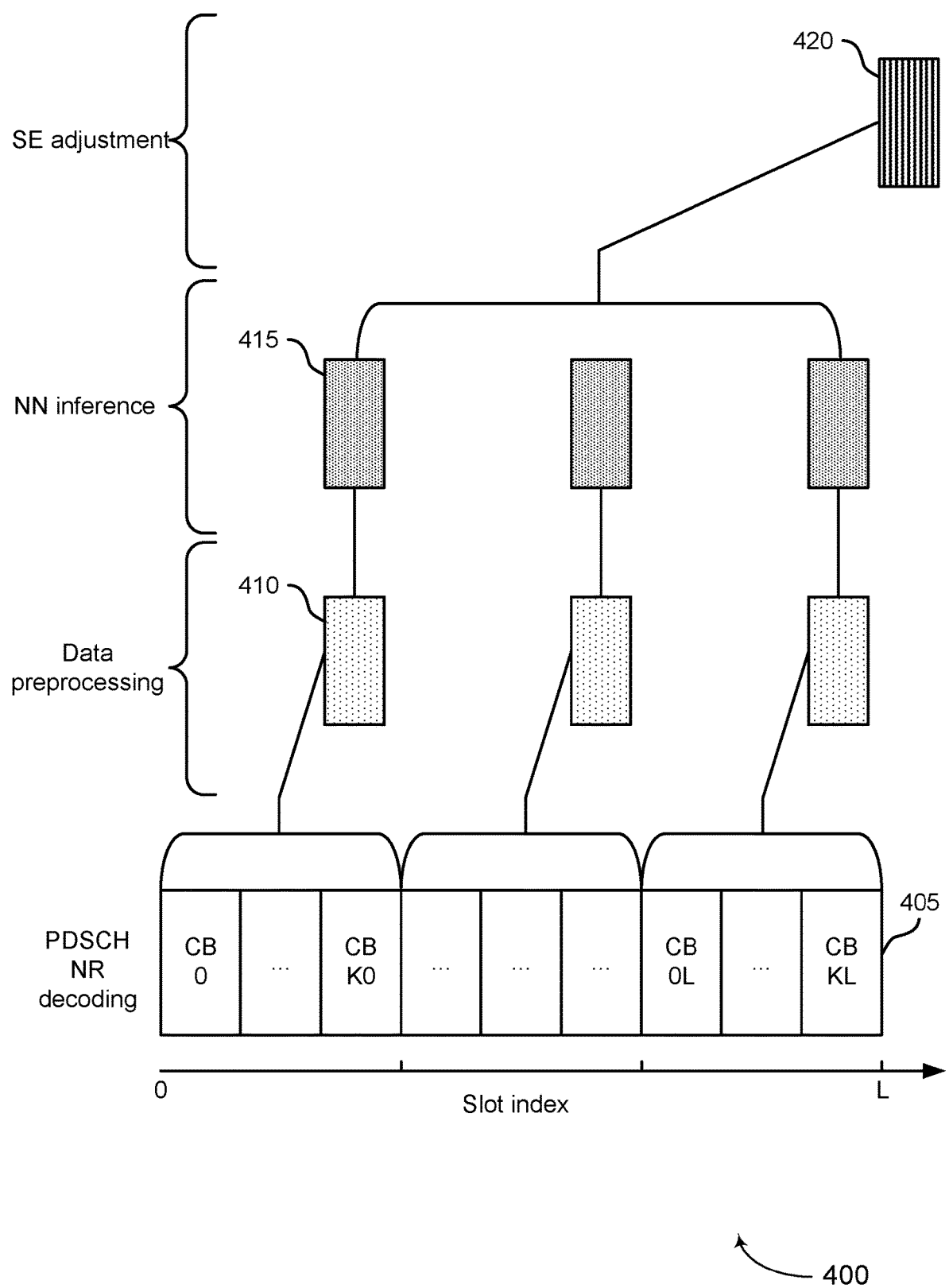
FIG. 4 illustrates an example of a data path that supports online adjustment for CSI in accordance with aspects of the present disclosure.

FIG. 4 illustrates an example of a data path 400 that supports online adjustment for CSI in accordance with aspects of the present disclosure. In some examples, data path 400 may implement or may be implemented by aspects of a wireless communications system as described with reference to FIGS. 1 and 2. For example, the data path 400 may be implemented at a UE 115 or a base station 105. The data path 400 depicts some examples of data partitioning and multiple signal processing operations that accomplish one or more aspects of the present disclosure. It is important to note that any one or more data partitioning schemes, as well as signal processing operations, including machine learning operations, may be implemented in any combination to perform an inference-based online tuning process.

The data path 400 portrays an example data partitioning scheme that supports derivation of preprocessed data that may ultimately be input to a signal processing operation, for example, a signal processing operation performed by a UE or a base station to determine adjustment values for channel state parameters. In the example illustrated by FIG. 4, slots of a PDSCH transmission may be broken down into smaller partitions (for example, CBs 405), enabling compartmented averaging schemes as well as varying degrees of statistical granularity. In other words, slots may be broken down into sections of varying sizes to characterize statistical behaviors that may differ depending on how large or small a section is. In some examples, each slot may be associated with a slot index, such as a range from 0 to L. Further, a given slot, such as slot 0 (in other words, the slot corresponding to the slot index 0) may include a set of CBs 405. In some instances, a communications slot may include a number K of CBs 405.

Within a slot, a downlink channel decoder, for example, of a UE, may extract decoding information from the K CBs. For example, the downlink channel decoder may extract information from each K CBs. The extracted decoding information, corresponding to the K CBs from slot 0, may undergo a data preprocessing 410 via transformation by one or more mathematical methods, one or more data analysis procedures, one or more feature extractions (for example, converting non-numerical data to numerical data), imputation (in other words, substitution of missing values), or any combination thereof. For example, the UE or the base station may perform statistical methods on the extracted decoding information to obtain one or more soft metrics (for example, iteration number, energy metric, bit errors). In some examples, the UE or the base station may perform, on the extracted decoding parameters, one or more dimensionality reduction operations, decomposition operations, or any combination thereof. Additionally or alternatively, the UE or the base station may feed the extracted decoder parameters to one or more feature scaling operations. For example, the feature operations may include rescaling the extracted decoder parameters, shifting the extracted decoder parameters, altering the distribution of the extracted decoder parameters, or any combination thereof. The preceding operations may apply in some examples to subsequent slots.

For example, the preceding operations may be applied to L communication slots as shown in FIG. 4.

Further, from each of the L slots, a set of L preprocessed data may be obtained. The set of L preprocessed data derived from the data preprocessing 410 may be utilized as inputs to one or more signal processing operations. For example, the set of L preprocessed data may be an example of one or more preprocessed decoder parameters as described with reference to FIG. 2. In some examples, the set of L preprocessed data may be used, by the UE or the base station, as inputs to a NN 415 in which the NN 415 infers whether the received communications may pass a TB CRC with a relatively higher MCS as compared to a granted MCS associated with the PDSCH transmission. Based on the output of the NN 415, the UE or the base station may compute an SE adjustment 420 as described with reference to FIGS. 2 and 3.

In some implementations, the UE or the base station may use the SE adjustment 420 to determine one or more adjustment values for one or more channel state parameters, for example, as described with reference to FIGS. 2 and 3. In some examples, the data path 400 may be iteratively utilized for subsequent PDSCH transmissions in a feedback loop to refine the one or more adjustment values and provide increasing accuracy for the one or more channel state parameters.

Figure 5:
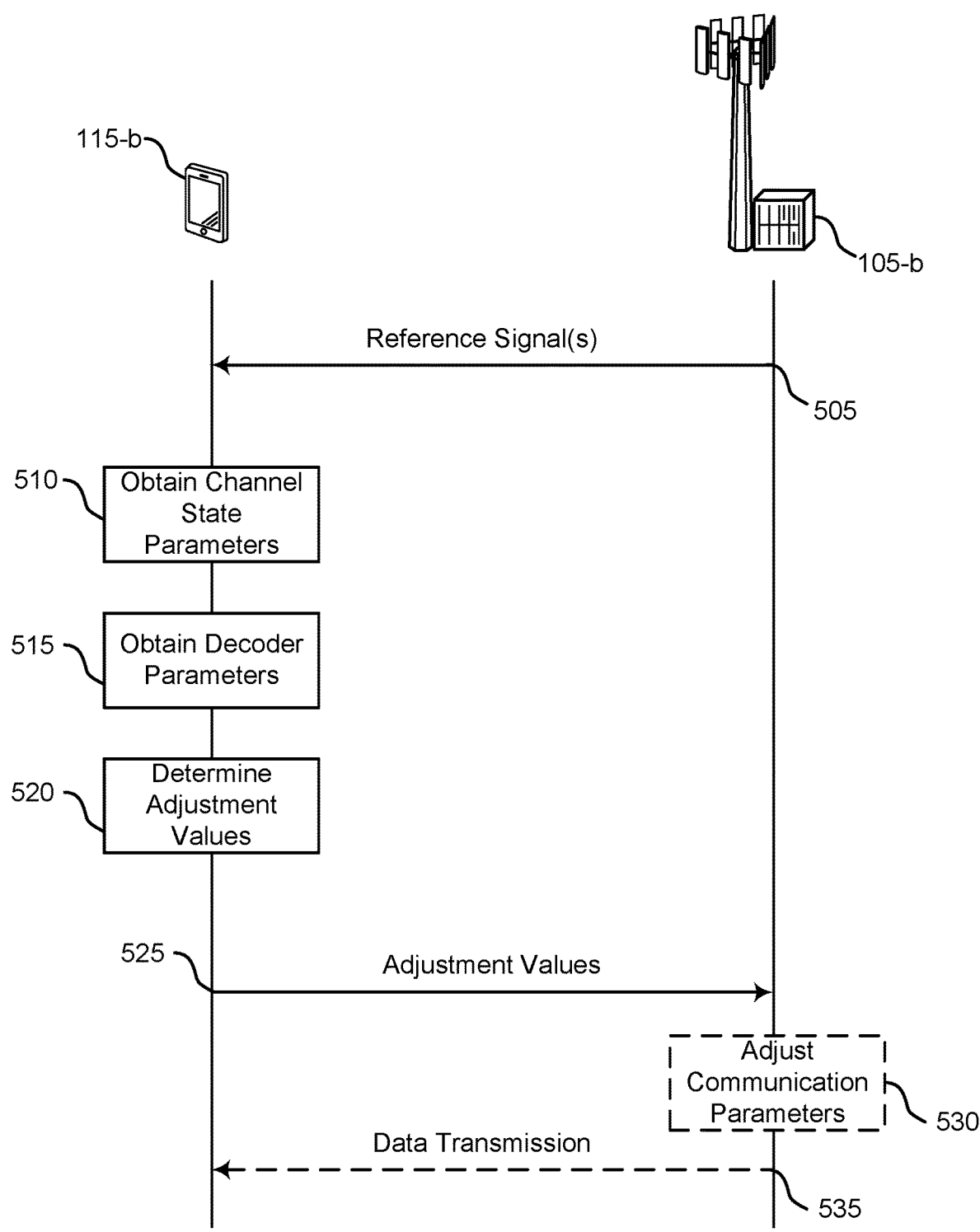
FIGS. 5-8 illustrate examples of process flows that support online adjustment for CSI in accordance with aspects of the present disclosure.

FIG. 5 illustrates an example of a process flow 500 that supports online adjustment for CSI in accordance with aspects of the present disclosure. In some examples, the process flow 500 may be implemented by aspects of the wireless communications system 100 or the wireless communications system 200 as described with reference to FIGS. 1 and 2. In the following description of the process flow 500, the operations between the base station 105-*b* and the UE 115-*b* may be performed in a different order than the example order shown, or the operations performed by the base station 105-*b* and the UE 115-*b* may be performed in different orders or at different times or by different devices (a different one of the base station 105-*b* or the UE 115-*b*). Some operations may also be omitted from the process flow 500, and other operations may be added to the process flow 500.

At 505, the base station 105-*b* may transmit one or more reference signals, such as CSI-RSs, to the UE 115-*b* via a communication link.

At 510, the UE 115-*b* may obtain one or more channel state parameters corresponding to the reference signals received at 505. For example, the UE 115-*b* may measure the one or more reference signals to determine the one or more channel state parameters.

At 515, the UE 115-*b* may obtain one or more preprocessed decoder parameters associated with a downlink transmission received from the base station 105-*b*. In some implementations, the preprocessed decoder parameters may correspond to a slot associated with the downlink transmission. The UE 115-*b* may measure and collect decoding parameters for each TB, each CB, or, in some examples, each CSI-RS instance (for example, if the UE 115-*b* receives multiple CSI-RSs at 505). The UE 115-*b* may preprocess the decoder parameters corresponding to the slot by applying one or more mathematical methods, one or more data analysis procedures, one or more feature extractions (for example, converting non-numerical data to numerical data), imputation (in other words, substitution of missing values), or any combination thereof. For example, the UE 115-*b* may obtain downlink information from the downlink transmission, calculate one or more parameters from the downlink transmission, or any combination thereof. The information may include statistics and values classifying the combined effects of, among other phenomena, scattering, fading, and power decay (in other words, a transfer function) corresponding to the downlink transmission. For example, the information may include statistical values of decoder soft metrics, such as a number of iterations, one or more energy metrics, or a bit error, among other examples.

At 520, the UE 115-b may determine a set of adjustment values for the channel state parameters by performing one or more signal processing operations using the preprocessed decoder parameters, the channel state parameters, or both. In some implementations, the UE 115-b may perform a first signal processing operation to predict or otherwise determine that the channel state parameters should be adjusted. For example, the UE 115-b may use the one or more decoder parameters and the channel state parameters as an input to an NN. The NN may determine whether an MCS relatively higher than a granted MCS associated with the downlink transmission may pass a CRC. If the NN determines that a higher MCS has a relatively high likelihood of passing the TB CRC, the UE 115-b may determine that the channel state parameters should be adjusted, for example, to improve throughput of the channel. The UE 115-b may perform a second signal processing operation to determine the set of adjustment values. For example, the UE 115-b may utilize a second machine learning operation to conduct an online iterative process based on calculating an expected SE for each of the higher MCS, the granted MCS, and a lower MCS. The UE 115-b may determine which of the expected SEs is a given value, such as in some examples a maximum value, and may set a value of a target SE to the given value, such as the maximum value. The UE 115-b may utilize a gradient descent-based iterative error correction technique to compute one or more error signals associated with the target SE. The UE 115-b may determine the set of adjustment values based on the error signals and the expected SEs.

At 525, the UE 115-b may transmit an indication of the set of adjustment values to the base station 105-b. For example, the UE 115-b may transmit an indication of a set of second channel state parameters that may include the set of adjustment values derived from the gradient descent-based iterative error correction technique.

At 530, the base station 105-b may adjust one or more communication parameters corresponding to the communication link with the UE 115-b according to the indicated set of adjustment values. For instance, the base station 105-b may adjust one or more communication parameters for subsequent communications with the UE 115-b, such as an MCS, based on the set of adjustment values.

At 535, the base station 105-b may transmit one or more data transmissions to the UE 115-b via the communication link and in accordance with the communication parameters adjusted at 530. The one or more data transmissions, along with subsequent data transmissions from the base station 105-b, may be analyzed repeatedly (for example, by the UE 115-b) via the NN and the online iterative process to form a feedback loop that dynamically adjusts the communication link to increase throughput and communication quality with the UE 115-b.

Figure 6:
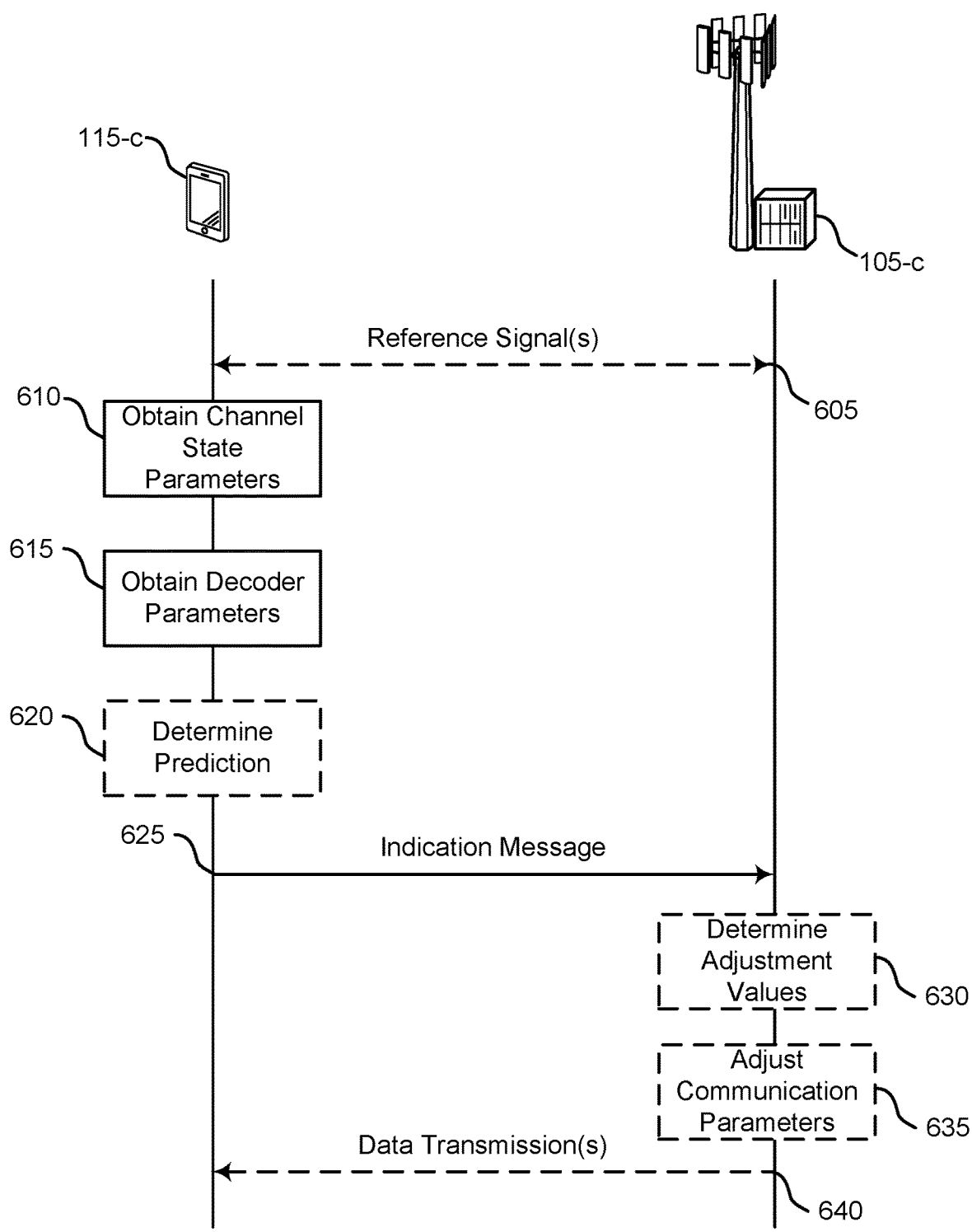

FIG. 6 illustrates an example of a process flow 600 that supports online adjustment for CSI in accordance with aspects of the present disclosure. In some examples, the process flow 600 may be implemented by aspects of the wireless communications system 100 or 200 as described with reference to FIGS. 1 and 2. In the following description of the process flow 600, the operations between the base station 105-c and the UE 115-c may be performed in a different order than the example order shown, or the operations performed by the base station 105-c and the UE 115-c may be performed in different orders or at different times or by different devices (a different one of the base station 105-c or the UE 115-c). Some operations may also be omitted from the process flow 600, and other operations may be added to the process flow 600.

At 605, the base station 105-c may transmit one or more reference signals to the UE 115-c, or the UE 115-c may transmit one or more reference signals to the base station 105-c over a channel. For example, the UE 115-c may transmit one or more SRSs to the base station 105-c, or the base station 105-c may transmit one or more CSI-RSs to the UE 115-c.

At 610, the UE 115-c may obtain one or more channel state parameters associated with one or more reference signals communicated over the channel, such as the one or more reference signals transmitted or received at 605. For example, the UE 115-c may measure one or more received CSI-RSs and may obtain the channel state parameters based on measuring the one or more CSI-RSs.

At 615, the UE 115-c may obtain one or more preprocessed decoder parameters associated with communications over the channel. For example, the UE 115-b may detect, from a downlink channel decoder, decoder information for each TB, each CB, each slot, or, in some examples, each CSI-RS instance associated with the downlink transmission. The decoder information may include statistics and values classifying the combined effects of, among other phenomena, scattering, fading, and power decay (in other words, a transfer function) corresponding to communications over the channel. For example, the information may include statistical values of decoder soft metrics, such as a number of iterations, one or more energy metrics, or a bit error, among other examples. The UE 115-c may preprocess the decoder information to obtain the preprocessed decoder parameters by applying one or more mathematical methods, one or more data analysis procedures, one or more feature extractions (for example, converting non-numerical data to numerical data), imputation (in other words, substitution of missing values), or any combination thereof.

At 620, the UE 115-c may optionally perform a signal processing operation to predict or otherwise determine that the one or more channel state parameters should be adjusted. For example, the UE 115-c may use the one or more preprocessed decoder parameters and the channel state parameters as an input to a NN. The NN may determine whether an MCS relatively higher than a granted MCS associated with communications over the channel may pass a CRC. Specifically, the NN may utilize a pretrained set of weights to compute a probability that an MCS that is relatively higher than the granted MCS may provide higher throughput over the communication link between the UE 115-c and the base station 105-c. If the NN predicts that the higher MCS may pass the CRC, the UE 115-c may determine that the channel state parameters may be adjusted and may transmit an indication of the prediction to the base station 105-c.

At 625, the UE 115-c may transmit, and the base station 105-c may receive, a message including an indication of the one or more preprocessed decoder parameters. In some examples, the one or more preprocessed decoder parameters may include one or more statistical values of one or more decoder metrics. In some examples, the message may also include an indication of the prediction from the UE 115-c. In some implementations, the message may be a quantized report including a negative acknowledgement or a positive acknowledgement.

At 630, the base station may optionally calculate a set of adjustment values for the channel state parameters, for example, based on receiving the indication of the one or more preprocessed decoder parameters, the indication of the prediction, or both. For example, the base station 105-c may utilize a signal processing operation, such as a machine learning operation, to conduct an online iterative process based on the one or more preprocessed decoder parameters. Based on the online iterative process, the base station 105-c may determine the set of adjustment values. In some implementations, the base station 105-c may determine one or more adjusted channel state parameters based on the set of adjustment values, for example, by combining the set of adjustment values with the one or more channel state parameters.

In some examples, the base station 105-c may additionally leverage the indication of the prediction to determine the adjustment values. For example, the base station 105-c may determine to calculate the set of adjustment values if the message received at 625 indicates that the UE 115-c determines (in other words, predicts) that the channel state parameters may be adjusted.

At 635, the base station 105-c may optionally adjust one or more communication parameters corresponding to the channel based on the set of adjustment values. For instance, the base station 105-c may adjust one or more communication parameters for subsequent communications with the UE 115-c, such as an MCS, based on the set of adjustment values.

At 640, the base station 105-c may transmit one or more data transmissions to the UE 115-c over the channel and in accordance with the communication parameters adjusted at 635 and based on the set of adjustment values. In some examples, the one or more data transmissions may be transmitted based on the one or more adjusted channel state parameters. The one or more data transmissions, along with subsequent data transmissions from the base station 105-c, may be analyzed repeatedly (for example, by the base station 105-c, the UE 115-c, or both) via the NN and the online iterative process to form a feedback loop that dynamically adjusts the communication link to increase throughput and communication quality with the UE 115-c.

Figure 7:
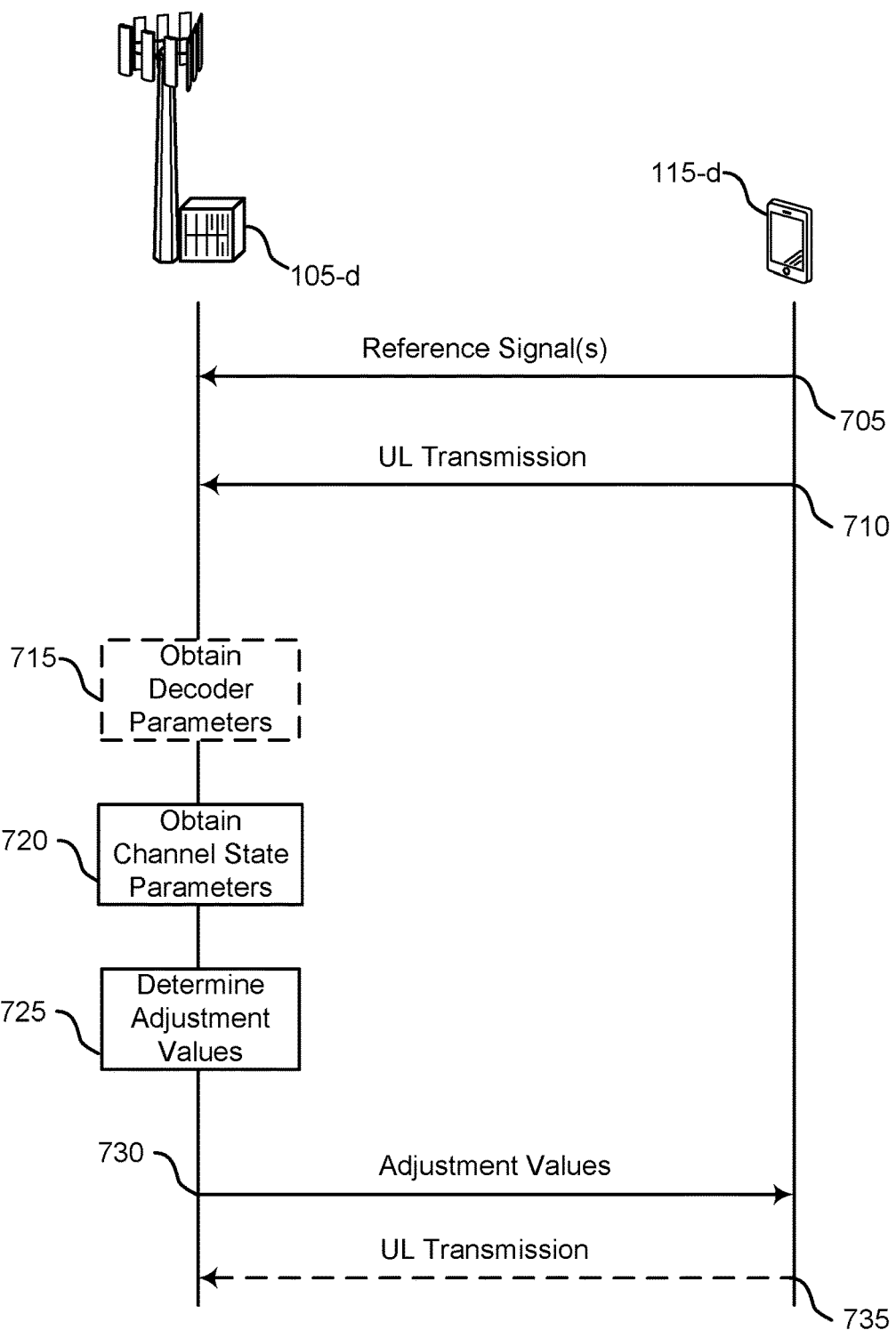

FIG. 7 illustrates an example of a process flow 700 that supports online adjustment for CSI in accordance with aspects of the present disclosure. In some examples, the process flow 700 may be implemented by aspects of the wireless communications system 100 or 200 as described with reference to FIGS. 1 and 2. In the following description of the process flow 700, the operations between the base station 105-d and the UE 115-d may be performed in a different order than the example order shown, or the operations performed by the base station 105-d and the UE 115-d may be performed in different orders or at different times or by different devices (a different one of the base station 105-d or the UE 115-d). Some operations may also be omitted from the process flow 700, and other operations may be added to the process flow 700.

At 705, the UE 115-d may transmit one or more reference signals (such as SRS), to the base station 105-d. At 710, the UE 115-d may transmit one or more uplink transmissions to the base station 105-d. In some examples, an uplink transmission of the one or more uplink transmissions may include uplink PUSCH from the UE 115-d.

At 715, the base station 105-d may determine one or more preprocessed decoder parameters associated with an uplink channel decoder used for decoding uplink channel transmissions received from the UE 115-d. For example, the base station 105-d may obtain the one or more preprocessed decoder parameters from uplink channel decoder information by performing one or more operations, such as data analysis or mathematical manipulations.

At 720, the base station 105-d may obtain one or more channel state parameters, for example, by measuring the one or more SRSs received at 710.

At 725, the base station 105-d may determine one or more adjustment values for the one or more channel state parameters based on one or more preprocessed decoder parameters. For example, the base station 105-d may determine one or more preprocessed decoder parameters based on receiving the one or more uplink transmissions at 710. In some implementations, the one or more preprocessed decoder parameters may be indicated by the UE 115-d, for example, at 710. In some implementations, the one or more signal processing operations may include one or more machine learning operations, such as an inference-based online tuning process. For example, the base station 105-d may perform a first signal processing operation to predict or otherwise determine that the one or more channel state parameters may be adjusted and may perform a second signal processing operation to calculate the one or more adjustment values.

At 730, the base station 105-d may transmit, to the UE 115-d, the one or more adjustment values determined at 725. In some examples, at 730, the base station 105-d may transmit, to the UE 115-d, a set of adjusted channel state parameters (in other words, a second set of channel state parameters) that includes the one or more adjustment values determined at 725). Specifically, the set of adjusted channel state parameters may include the adjustment values determined at 725 for the channel state parameters determined at 720.

At 735, the UE 115-d may transmit an uplink transmission to the base station 105-d based on the one or more adjustment values received at 730. In some examples, the uplink transmission may be based on the set of adjusted channel state parameters, for example, if the UE 115-d received the set of adjusted channel state parameters at 730.

Figure 8:
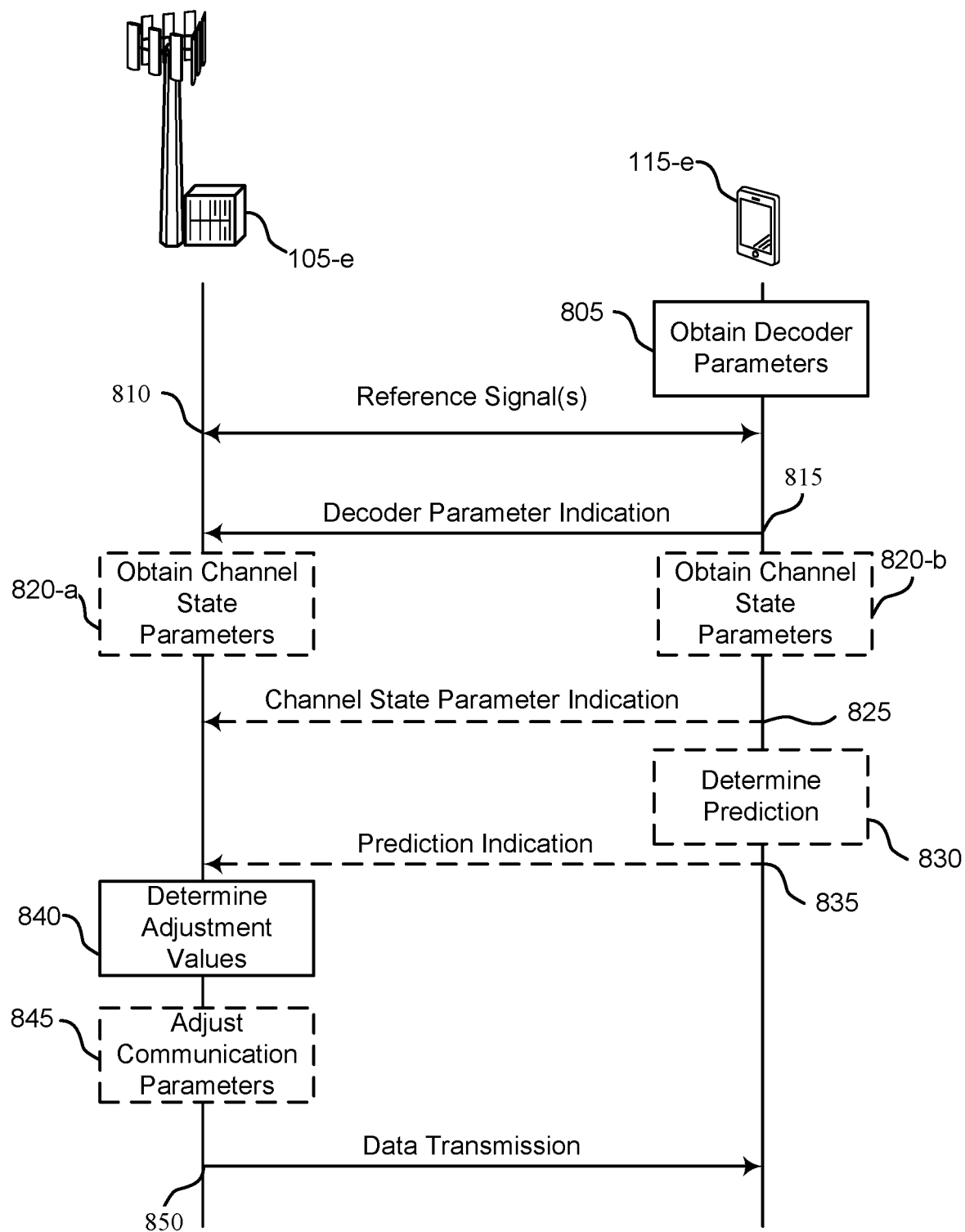

FIG. 8 illustrates an example of a process flow 800 that supports online adjustment for CSI in accordance with aspects of the present disclosure. In some examples, the process flow 800 may be implemented by aspects of the wireless communications system 100 or wireless communications system 200 as described with reference to FIGS. 1 and 2. In the following description of the process flow 800, the operations between the base station 105-e and the UE 115-e may be performed in a different order than the example order shown, or the operations performed by the base station 105-e and the UE 115-e may be performed in different orders or at different times or by different devices (a different one of the base station 105-e or the UE 115-e). Some operations may also be omitted from the process flow 800, and other operations may be added to the process flow 800.

At 805, the UE 115-e may obtain one or more preprocessed decoder parameters associated with a downlink channel decoder of the UE 115-e. The UE 115-e may detect decoder information from the downlink channel decoder associated with a downlink transmission transmitted over a channel from the base station 105-e. The UE 115-e may obtain the one or more preprocessed decoder parameters by performing one or more operations on the decoder information, such as data analysis, mathematical manipulations, among other examples.

At 810, the base station 105-e may transmit one or more reference signals to the UE 115-e, or the UE 115-e may transmit one or more reference signals to the base station 105-e over a channel. For example, the UE 115-e may transmit one or more SRSs to the base station 105-e, or the base station 105-e may transmit one or more CSI-RSs to the UE 115-e.

At 815, the UE 115-e may transmit an indication of the one or more preprocessed decoder parameters to the base station 105-e.

At 820-a, the base station 105-e may optionally obtain one or more channel state parameters associated with one or more reference signals communicated over the channel. For example, the base station 105-e may measure one or more SRSs received at 810.

At 820-b, the UE 115-e may optionally obtain one or more channel state parameters associated with one or more reference signals communicated over a channel. For example, the UE 115-e may measure one or more reference signals received at 810.

At 825, the UE 115-e may transmit a channel state parameter indication indicating the optionally obtained one or more channel state parameters associated with one or more reference signals to the base station 105-e.

At 830, the UE 115-e may optionally perform one or more signal processing operations to determine that the set of channel state parameters may be adjusted. For example, the UE 115-e may utilize the channel state parameters, the preprocessed decoder parameters, or other information associated with communications over the channel as inputs to a machine learning operation. In some examples, the machine learning operation may be performed by or based on an NN. The machine learning operation may predict whether an MCS that is relatively higher than a granted MCS associated with communications over the channel may pass a CRC. If the higher MCS passes a CRC, the UE 115-e may determine that the one or more channel state parameters may be adjusted. If the UE 115-e performs the prediction, the UE 115-e may transmit an indication of the prediction to the base station 105-e at 835.

At 840, the base station 105-e may perform one or more signal processing operations using the channel state parameters, the one or more preprocessed decoder parameters, or both to determine one or more adjustment values for the one or more channel state parameters. In some implementations, if the UE 115-e determines a prediction at 830 and transmits an indication of the prediction at 835, the base station 105-e may use the outcome of the prediction as an initiator for a signal processing operation to determine the one or more adjustment values, such as an online iterative process. For example, the base station 105-e may initiate an online iterative process based on receiving an indication that the channel state parameters should be adjusted. In some other implementations, the base station 105-e may determine the prediction using a first signal processing operation and may determine the one or more adjustment values using a second signal processing operation. The one or more signal processing operations may include or may be examples of one or more machine learning operations.

For example, the base station 105-e may utilize a machine learning operation to conduct an online iterative process based on calculating an expected SE for one or more respective MCSs associated with communications over the channel. The base station 105-e may determine which of the expected SEs is a given value, such as in some examples a maximum value, and may set a value of a target SE to the given value, such as the maximum value, and may utilize a gradient descent-based iterative error correction technique to compute one or more error signals associated with the target SE. The base station 105-e may determine the one or more adjustment values based on the error signals and the expected SEs. In some examples, the base station 105-e may determine one or more adjusted channel state parameters (in other words, one or more second channel state parameters) based on the one or more adjustment values, for example, by combining the one or more adjustment values with the one or more channel state parameters determined at 820-a or at 820-b.

At 845, the base station 105-e may optionally adjust one or more communication parameters corresponding to the channel based on the one or more adjustment values. For instance, the base station 105-e may adjust one or more communication parameters for subsequent communications with the UE 115-e, such as an MCS, based on the set of adjustment values.

At 850, the base station 105-e may transmit one or more data transmissions to the UE 115-e based on the one or more adjustment values. For example, the base station 105-e may transmit the one or more data transmissions to the UE 115-e using the one or more communication parameters adjusted at 845.

Figure 9:
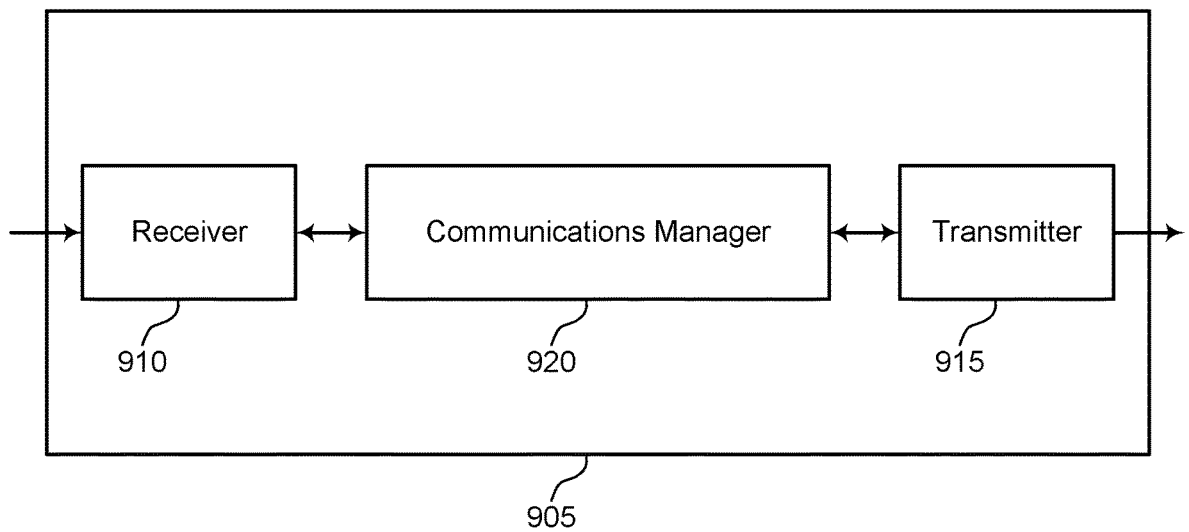
FIGS. 9 and 10 show block diagrams of devices that support online adjustment for CSI in accordance with aspects of the present disclosure.

FIG. 9 shows a block diagram of a device 905 that supports online adjustment for CSI in accordance with aspects of the present disclosure. The device 905 may be an example of aspects of a UE 115 as described herein. The device 905 may include a receiver 910, a transmitter 915, and a communications manager 920. The communications manager 920 can be implemented, at least in part, by one or both of a modem and a processor. Each of these components may be in communication with one another (for example, via one or more buses).

The receiver 910 may provide a means for receiving information such as packets, user data, control information, or any combination thereof associated with various information channels (for example, control channels, data channels, information channels related to online adjustment for CSI). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (for example, control channels, data channels, information channels related to online adjustment for CSI). In some examples, the transmitter 915 may be co-located with a receiver 910 in a transceiver component. The transmitter 915 may utilize a single antenna or a set of multiple antennas.

The communications manager 920, the receiver 910, the transmitter 915, or various combinations thereof or various components thereof may be examples of means for performing various aspects of online adjustment for CSI as described herein. For example, the communications manager 920, the receiver 910, the transmitter 915, or various combinations or components thereof may support a method for performing one or more of the functions described herein.

In some examples, the communications manager 920 may be configured to perform various operations (for example, receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. For example, the communications manager 920 may be configured as or otherwise support a means for receiving, from a base station, one or more CSI-RSs for a downlink channel. The communications manager 920 may be configured as or otherwise support a means for measuring one or more first channel state parameters of the one or more CSI-RSs. The communications manager 920 may be configured as or otherwise support a means for detecting, from a downlink channel decoder, one or more preprocessed decoder parameters associating with a downlink transmission received on the downlink channel. The communications manager 920 may be configured as or otherwise support a means for determining, using one or more signal processing operations and based on the one or more preprocessed decoder parameters, one or more adjustment values for the one or more first channel state parameters. The communications manager 920 may be configured as or otherwise support a means for transmitting, to the base station, the one or more adjustment values for the one or more first channel state parameters.

Additionally or alternatively, the communications manager 920 may support wireless communication at a UE in accordance with examples as disclosed herein. For example, the communications manager 920 may be configured as or otherwise support a means for determining one or more channel state parameters associated with one or more reference signals communicated over a channel. The communications manager 920 may be configured as or otherwise support a means for detecting, from a downlink channel decoder, one or more preprocessed decoder parameters associated with communication over the channel. The communications manager 920 may be configured as or otherwise support a means for transmitting, to a base station, a message including an indication of the one or more preprocessed decoder parameters based on determining the one or more channel state parameters and detecting the one or more preprocessed decoder parameters.

By including or configuring the communications manager 920 in accordance with examples as described herein, the device 905 (for example, a processor controlling or otherwise coupled to the receiver 910, the transmitter 915, the communications manager 920, or any combination thereof) may support techniques for reduced computational complexity in determining accurate CSI estimations. By utilizing one or more signal processing techniques that may be pretrained, the device 905 may determine one or more adjustment values for one or more channel state parameters. The device 905 may thereby report CSI with increased accuracy without transmitting multiple signals or conducting complex iterative calculations, thus reducing processing, reducing power consumption, and increasing efficiency in the utilization of communication resources.

Figure 10:
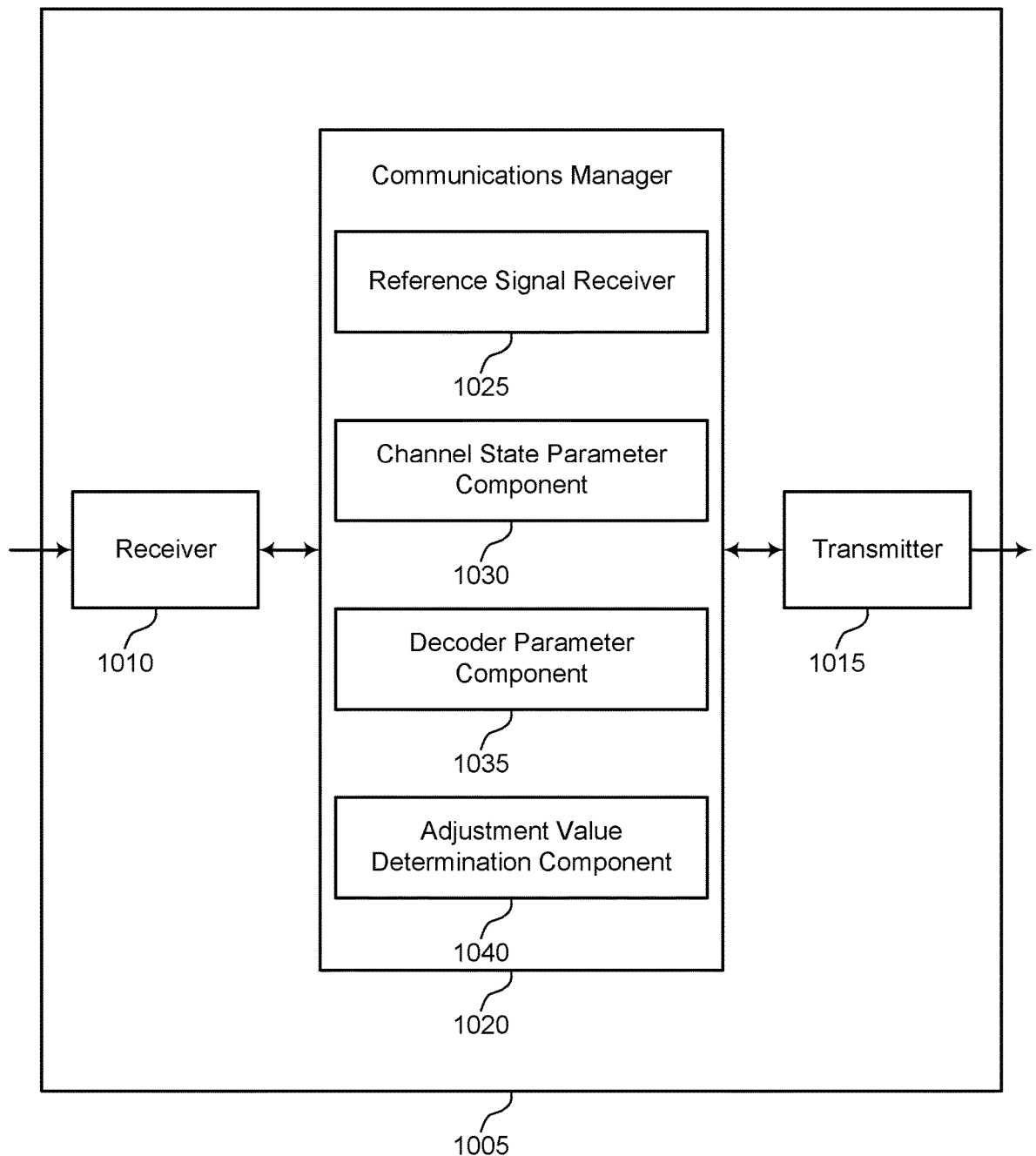

FIG. 10 shows a block diagram of a device 1005 that supports online adjustment for CSI in accordance with aspects of the present disclosure. The device 1005 may be an example of aspects of a device 905 or a UE 115 as described herein. The device 1005 may include a receiver 1010, a transmitter 1015, and a communications manager 1020. The communications manager 1020 can be implemented, at least in part, by one or both of a modem and a processor. Each of these components may be in communication with one another (for example, via one or more buses).

The receiver 1010 may provide a means for receiving information such as packets, user data, control information, or any combination thereof associated with various information channels (for example, control channels, data channels, information channels related to online adjustment for CSI). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (for example, control channels, data channels, information channels related to online adjustment for CSI). In some examples, the transmitter 1015 may be co-located with a receiver 1010 in a transceiver component. The transmitter 1015 may utilize a single antenna or a set of multiple antennas.

The device 1005, or various components thereof, may be an example of means for performing various aspects of online adjustment for CSI as described herein. For example, the communications manager 1020 may include a reference signal receiver 1025, a channel state parameter component 1030, a decoder parameter component 1035, an adjustment value determination component 1040, or any combination thereof. The communications manager 1020 may be an example of aspects of a communications manager 920 as described herein. In some examples, the communications manager 1020, or various components thereof, may be configured to perform various operations (for example, receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a UE in accordance with examples as disclosed herein. The reference signal receiver 1025 may be configured as or otherwise support a means for receiving, from a base station, one or more CSI-RSs for a downlink channel. The channel state parameter component 1030 may be configured as or otherwise support a means for measuring one or more first channel state parameters of the one or more CSI-RSs. The decoder parameter component 1035 may be configured as or otherwise support a means for detecting, from a downlink channel decoder, one or more preprocessed decoder parameters associated with a downlink transmission received on the downlink channel. The adjustment value determination component 1040 may be configured as or otherwise support a means for determining, using one or more signal processing operations and based on the one or more preprocessed decoder parameters, one or more adjustment values for the one or more first channel state parameters. The channel state parameter component 1030 may be configured as or otherwise support a means for transmitting, to the base station, the one or more adjustment values for the one or more first channel state parameters.

Additionally or alternatively, the communications manager 1020 may support wireless communication at a UE in accordance with examples as disclosed herein. The channel state parameter component 1030 may be configured as or otherwise support a means for determining one or more channel state parameters associated with one or more reference signals communicated over a channel. The decoder parameter component 1035 may be configured as or otherwise support a means for detecting, from a downlink channel decoder, one or more preprocessed decoder parameters associated with communication over the channel. The decoder parameter component 1035 may be configured as or otherwise support a means for transmitting, to a base station, a message including an indication of the one or more preprocessed decoder parameters based on determining the one or more channel state parameters and detecting the one or more preprocessed decoder parameters.

Figure 11:
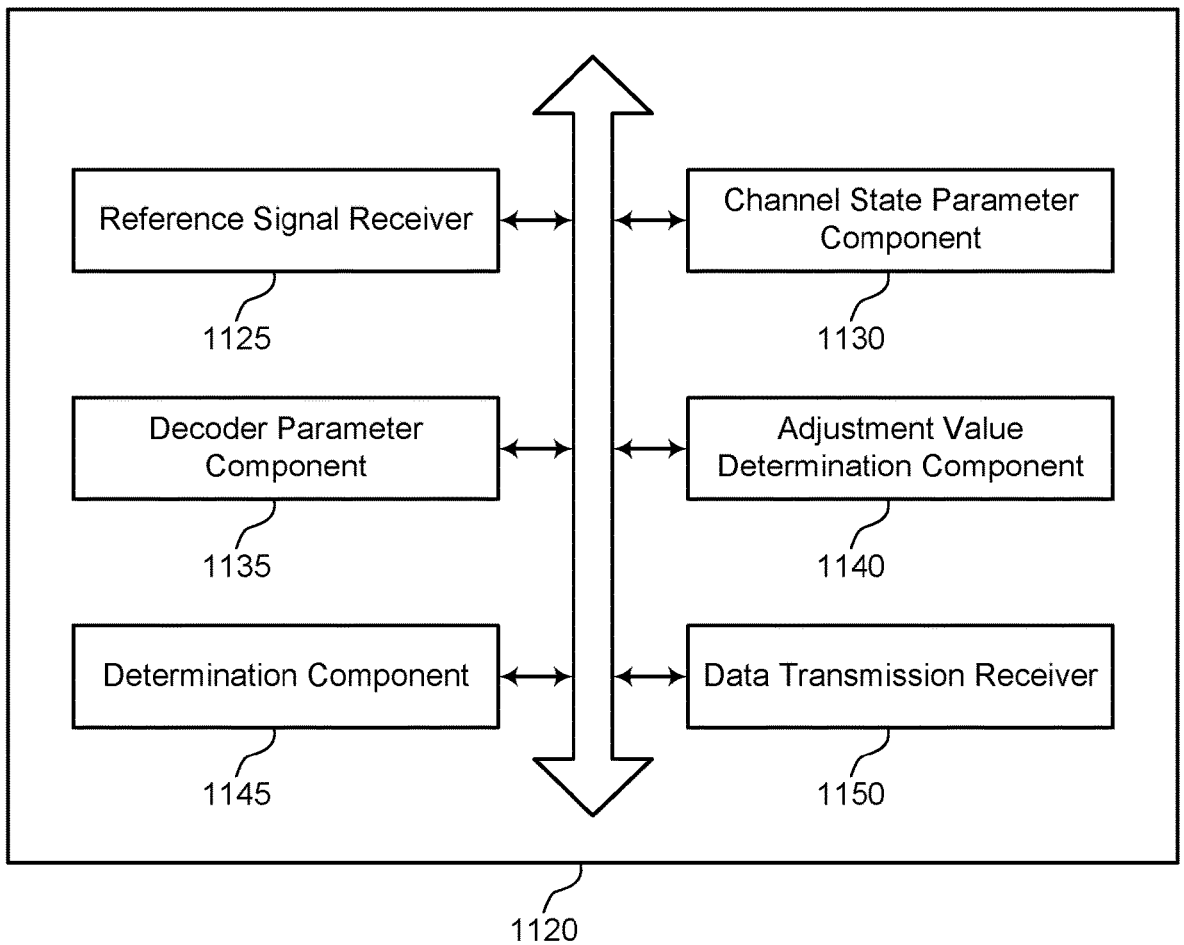
FIG. 11 shows a block diagram of a communications manager that supports online adjustment for CSI in accordance with aspects of the present disclosure.

FIG. 11 shows a block diagram of a communications manager 1120 that supports online adjustment for CSI in accordance with aspects of the present disclosure. The communications manager 1120, or various components thereof, may be an example of means for performing various aspects of online adjustment for CSI as described herein. For example, the communications manager 1120 may include a reference signal receiver 1125, a channel state parameter component 1130, a decoder parameter component 1135, an adjustment value determination component 1140, a prediction component 1145, a data transmission receiver 1150, or any combination thereof. Each of these components may communicate, directly or indirectly, with one another (for example, via one or more buses).

The communications manager 1120 may support wireless communications at a UE in accordance with examples as disclosed herein. The reference signal receiver 1125 may be configured as or otherwise support a means for receiving, from a base station, one or more CSI-RSs for a downlink channel. The channel state parameter component 1130 may be configured as or otherwise support a means for measuring one or more first channel state parameters of the one or more CSI-RSs. The decoder parameter component 1135 may be configured as or otherwise support a means for detecting, from a downlink channel decoder, one or more preprocessed decoder parameters associated with a downlink transmission received on the downlink channel. The adjustment value determination component 1140 may be configured as or otherwise support a means for determining, using one or more signal processing operations and based on the one or more preprocessed decoder parameters, one or more adjustment values for the one or more first channel state parameters. In some examples, the channel state parameter component 1130 may be configured as or otherwise support a means for transmitting, to the base station,] the one or more adjustment values for the one or more first channel state parameters.

In some examples, transmitting the one or more adjustment values includes transmitting one or more second channel state parameters associated with the one or more CSI-RSs, the one or more second channel state parameters including the one or more adjustment values. In some examples, the data transmission receiver 1150 may be configured as or otherwise support a means for receiving, from the base station, one or more downlink data transmissions based on the one or more second channel state parameters.

In some examples, to support determining the one or more adjustment values, the prediction component 1145 may be configured as or otherwise support a means for determining, using a first signal processing operation, that the one or more first channel state parameters may be adjusted to increase throughput based on the one or more preprocessed decoder parameters. In some examples, to support determining the one or more adjustment values, the adjustment value determination component 1140 may be configured as or otherwise support a means for determining, using a second signal processing operation, the one or more adjustment values for the one or more first channel state parameters.

In some examples, the first signal processing operation includes a first machine learning operation, and the second signal processing operation includes a second machine learning operation.

In some examples, determining that the one or more first channel state parameters may be adjusted includes using a machine learning operation implemented by a neural network operation to determine that an MCS that is higher than a granted MCS associated with the downlink transmission passes a CRC.

In some examples, determining the one or more adjustment values includes using a machine learning operation implemented by an online iterative process to calculate one or more expected SE values for one or more respective MCSs associated with the downlink transmission.

In some examples, determining the one or more adjustment values includes setting a target spectrum efficiency based on the one or more respective MCSs. In some examples, the one or more respective MCSs include a granted MCS, an MCS that is lower than the granted MCS, and an MCS that is higher than the granted MCS.

In some examples, transmitting the one or more adjustment values includes transmitting a CSI report including the one or more adjustment values, the one or more adjustment values being based on at least one of the one or more expected SE values.

In some examples, the one or more preprocessed decoder parameters include one or more statistical values of one or more decoder metrics.

In some examples, detecting the one or more preprocessed decoder parameters includes detecting the one or more preprocessed decoder parameters for each slot of the downlink transmission.

Additionally or alternatively, the communications manager 1120 may support wireless communication at a UE in accordance with examples as disclosed herein. In some examples, the channel state parameter component 1130 may be configured as or otherwise support a means for determining one or more channel state parameters associated with one or more reference signals communicated over a channel. In some examples, the decoder parameter component 1135 may be configured as or otherwise support a means for detecting, from a downlink channel decoder, one or more preprocessed decoder parameters associated with communication over the channel. In some examples, the decoder parameter component 1135 may be configured as or otherwise support a means for transmitting, to a base station, a message including an indication of the one or more preprocessed decoder parameters based on determining the one or more channel state parameters and detecting the one or more preprocessed decoder parameters.

In some examples, the prediction component 1145 may be configured as or otherwise support a means for determining, using one or more signal processing operations, that the one or more channel state parameters may be adjusted to increase throughput based on the one or more preprocessed decoder parameters, where transmitting the message includes transmitting an indication of the determining.

In some examples, determining that the one or more channel state parameters may be adjusted includes using a machine learning operation implemented by a neural network operation to determine that an MCS that is higher than a granted MCS associated with communications over the channel passes a CRC.

In some examples, transmitting the indication of the determining includes transmitting a quantized report that includes a negative acknowledgement or a positive acknowledgement.

In some examples, the one or more reference signals include one or more CSI-RSs, the method further including receiving, from the base station, the one or more CSI-RSs. In some examples, determining one or more channel state parameters is based on receiving the one or more CSI-RSs and measuring the one or more CSI-RSs.

In some examples, the one or more reference signals include one or more SRSs, the method further including transmitting, to the base station, the one or more SRSs. In some examples, determining one or more channel state parameters is based on transmitting the one or more SRSs.

In some examples, transmitting the indication of the one or more preprocessed decoder parameters includes transmitting the one or more preprocessed decoder parameters including one or more statistical values of one or more decoder metrics.

Figure 12:
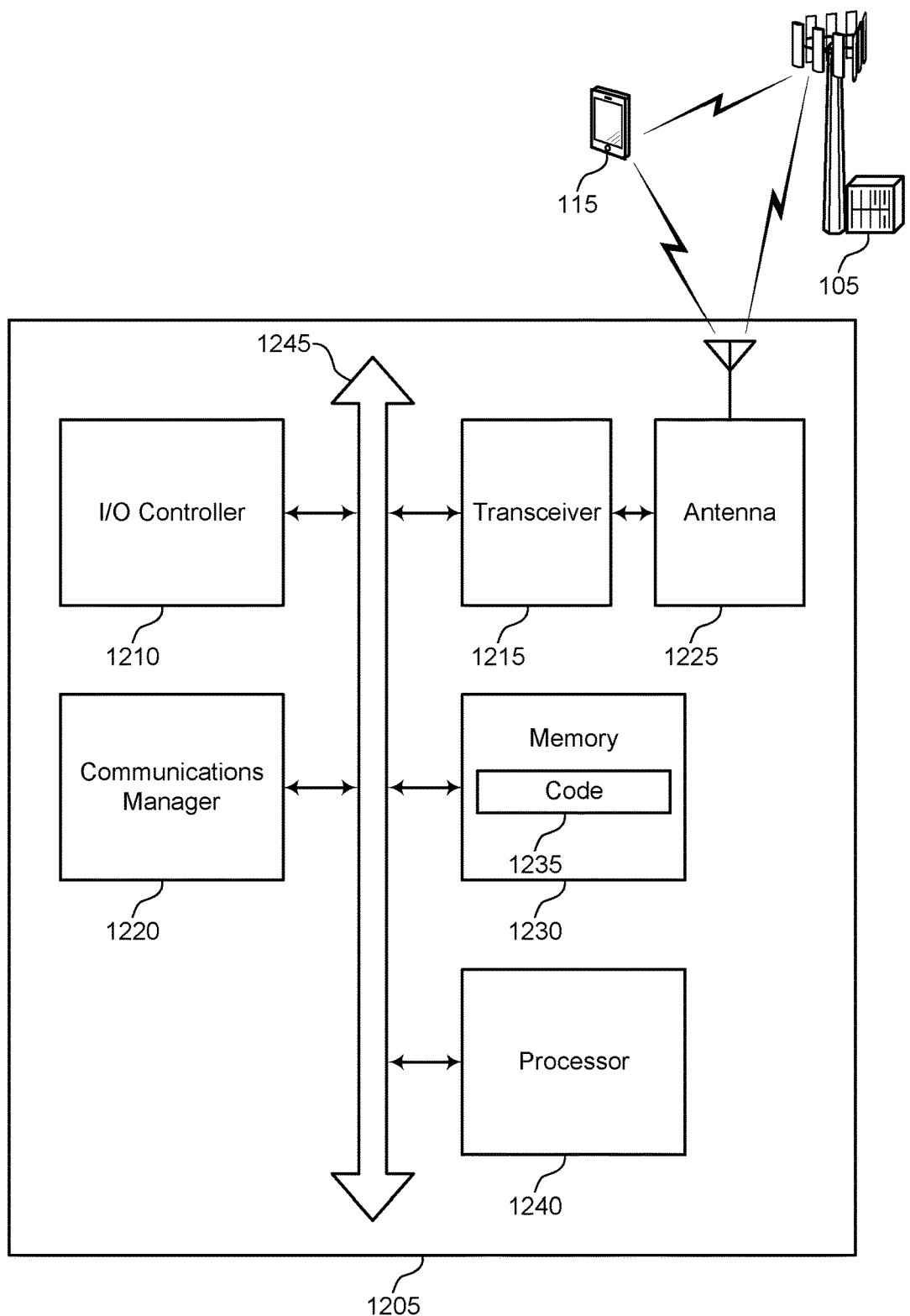
FIG. 12 shows a diagram of a system including a device that supports online adjustment for CSI in accordance with aspects of the present disclosure.

FIG. 12 shows a diagram of a system 1200 including a device 1205 that supports online adjustment for CSI in accordance with aspects of the present disclosure. The device 1205 may be an example of or include the components of a device 905, a device 1005, or a UE 115 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (for example, operatively, communicatively, functionally, electronically, electrically) via one or more buses (for example, a bus 1245).

The I/O controller 1210 may manage input and output signals for the device 1205. The I/O controller 1210 may also manage peripherals not integrated into the device 1205. In some examples, the I/O controller 1210 may represent a physical connection or port to an external peripheral. In some examples, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some examples, the I/O controller 1210 may be implemented as part of a processor, such as the processor 1240. In some examples, a user may interact with the device 1205 via the I/O controller 1210 or via hardware components controlled by the I/O controller 1210.

In some examples, the device 1205 may include a single antenna 1225. However, in some other examples, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some examples, the code 1235 may not be directly executable by the processor 1240 but may cause a computer (for example, when compiled and executed) to perform functions described herein. In some examples, the memory 1230 may contain, among other things, a basic I/O system (BIOS) which may control basic hardware or software operation such as the interaction with peripheral components or devices.

The processor 1240 may include an intelligent hardware device (for example, a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some examples, the processor 1240 may be configured to operate a memory array using a memory controller. In some other examples, a memory controller may be integrated into the processor 1240. The processor 1240 may be configured to execute computer-readable instructions stored in a memory (for example, the memory 1230) to cause the device 1205 to perform various functions (for example, functions or tasks supporting online adjustment for CSI). For example, the device 1205 or a component of the device 1205 may include a processor 1240 and memory 1230 coupled to the processor 1240, the processor 1240 and memory 1230 configured to perform various functions described herein.

The communications manager 1220 may support wireless communications at a UE in accordance with examples as disclosed herein. For example, the communications manager 1220 may be configured as or otherwise support a means for receiving, from a base station, one or more CSI-RSs for a downlink channel. The communications manager 1220 may be configured as or otherwise support a means for measuring one or more first channel state parameters of the one or more CSI-RSs. The communications manager 1220 may be configured as or otherwise support a means for detecting, from a downlink channel decoder, one or more preprocessed decoder parameters associating with a downlink transmission received on the downlink channel. The communications manager 1220 may be configured as or otherwise support a means for determining, using one or more signal processing operations and based on the one or more preprocessed decoder parameters, one or more adjustment values for the one or more first channel state parameters. The communications manager 1220 may be configured as or otherwise support a means for transmitting, to the base station, the one or more adjustment values for the one or more first channel state parameters.

Additionally or alternatively, the communications manager 1220 may support wireless communication at a UE in accordance with examples as disclosed herein. For example, the communications manager 1220 may be configured as or otherwise support a means for determining one or more channel state parameters associated with one or more reference signals communicated over a channel. The communications manager 1220 may be configured as or otherwise support a means for detecting, from a downlink channel decoder, one or more preprocessed decoder parameters associating with communication over the channel. The communications manager 1220 may be configured as or otherwise support a means for transmitting, to a base station, a message including an indication of the one or more preprocessed decoder parameters based on determining the one or more channel state parameters and detecting the one or more preprocessed decoder parameters.

By including or configuring the communications manager 1220 in accordance with examples as described herein, the device 1205 may support techniques for reducing latency in communications and increasing throughput of data transmissions. For example, by leveraging one or more signal processing operations, the device 1205 may iteratively adjust channel state parameters to provide increased accuracy in CSI reporting, which may result in more robust communications, reduced latency, and improved coordination between devices.

In some examples, the communications manager 1220 may be configured to perform various operations (for example, receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of online adjustment for CSI as described herein, or the processor 1240 and the memory 1230 may be otherwise configured to perform or support such operations.

Figure 13:
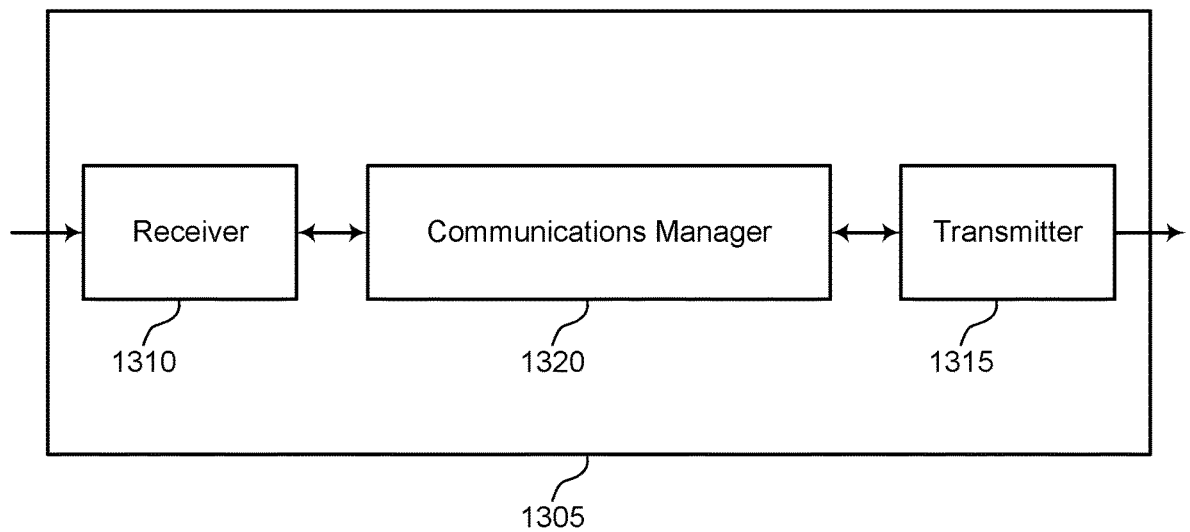
FIGS. 13 and 14 show block diagrams of devices that support online adjustment for CSI in accordance with aspects of the present disclosure.

FIG. 13 shows a block diagram of a device 1305 that supports online adjustment for CSI in accordance with aspects of the present disclosure. The device 1305 may be an example of aspects of a base station 105 as described herein. The device 1305 may include a receiver 1310, a transmitter 1315, and a communications manager 1320. The communications manager 1320 can be implemented, at least in part, by one or both of a modem and a processor. Each of these components may be in communication with one another (for example, via one or more buses).

The receiver 1310 may provide a means for receiving information such as packets, user data, control information, or any combination thereof associated with various information channels (for example, control channels, data channels, information channels related to online adjustment for CSI). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (for example, control channels, data channels, information channels related to online adjustment for CSI). In some examples, the transmitter 1315 may be co-located with a receiver 1310 in a transceiver component. The transmitter 1315 may utilize a single antenna or a set of multiple antennas.

The communications manager 1320, the receiver 1310, the transmitter 1315, or various combinations thereof or various components thereof may be examples of means for performing various aspects of online adjustment for CSI as described herein. For example, the communications manager 1320, the receiver 1310, the transmitter 1315, or various combinations or components thereof may support a method for performing one or more of the functions described herein.

In some examples, the communications manager 1320 may be configured to perform various operations (for example, receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communications at a base station in accordance with examples as disclosed herein. For example, the communications manager 1320 may be configured as or otherwise support a means for receiving, from a UE, one or more SRSs for an uplink channel. The communications manager 1320 may be configured as or otherwise support a means for measuring one or more first channel state parameters of the one or more SRSs. The communications manager 1320 may be configured as or otherwise support a means for decoding one or more uplink transmissions received from the UE. The communications manager 1320 may be configured as or otherwise support a means for determining, using one or more signal processing operations and based on one or more preprocessed decoder parameters, one or more adjustment values for the one or more first channel state parameters. The communications manager 1320 may be configured as or otherwise support a means for transmitting, to the UE, the one or more adjustment values for the one or more first channel state parameters.

Additionally or alternatively, the communications manager 1320 may support wireless communications at a base station in accordance with examples as disclosed herein. For example, the communications manager 1320 may be configured as or otherwise support a means for determining one or more channel state parameters associated with one or more reference signals communicated over a channel. The communications manager 1320 may be configured as or otherwise support a means for receiving, from a UE, a message including an indication of one or more preprocessed decoder parameters associated with a downlink channel decoder of the UE. The communications manager 1320 may be configured as or otherwise support a means for determining, based on the indication of the one or more preprocessed decoder parameters, one or more adjustment values associated with the one or more channel state parameters. The communications manager 1320 may be configured as or otherwise support a means for transmitting, to the UE, a downlink transmission based on the one or more adjustment values associated with the one or more channel state parameters.

By including or configuring the communications manager 1320 in accordance with examples as described herein, the device 1305 (for example, a processor controlling or otherwise coupled to the receiver 1310, the transmitter 1315, the communications manager 1320, or any combination thereof) may support techniques for reduced computational complexity in determining accurate CSI estimations. By utilizing one or more signal processing operations that may be pretrained, the device 1305 may more accurately estimate CSI without transmitting multiple signals or conducting complex iterative calculations, thus reducing processing, reducing power consumption, and increasing efficiency in the utilization of communication resources.

Figure 14:
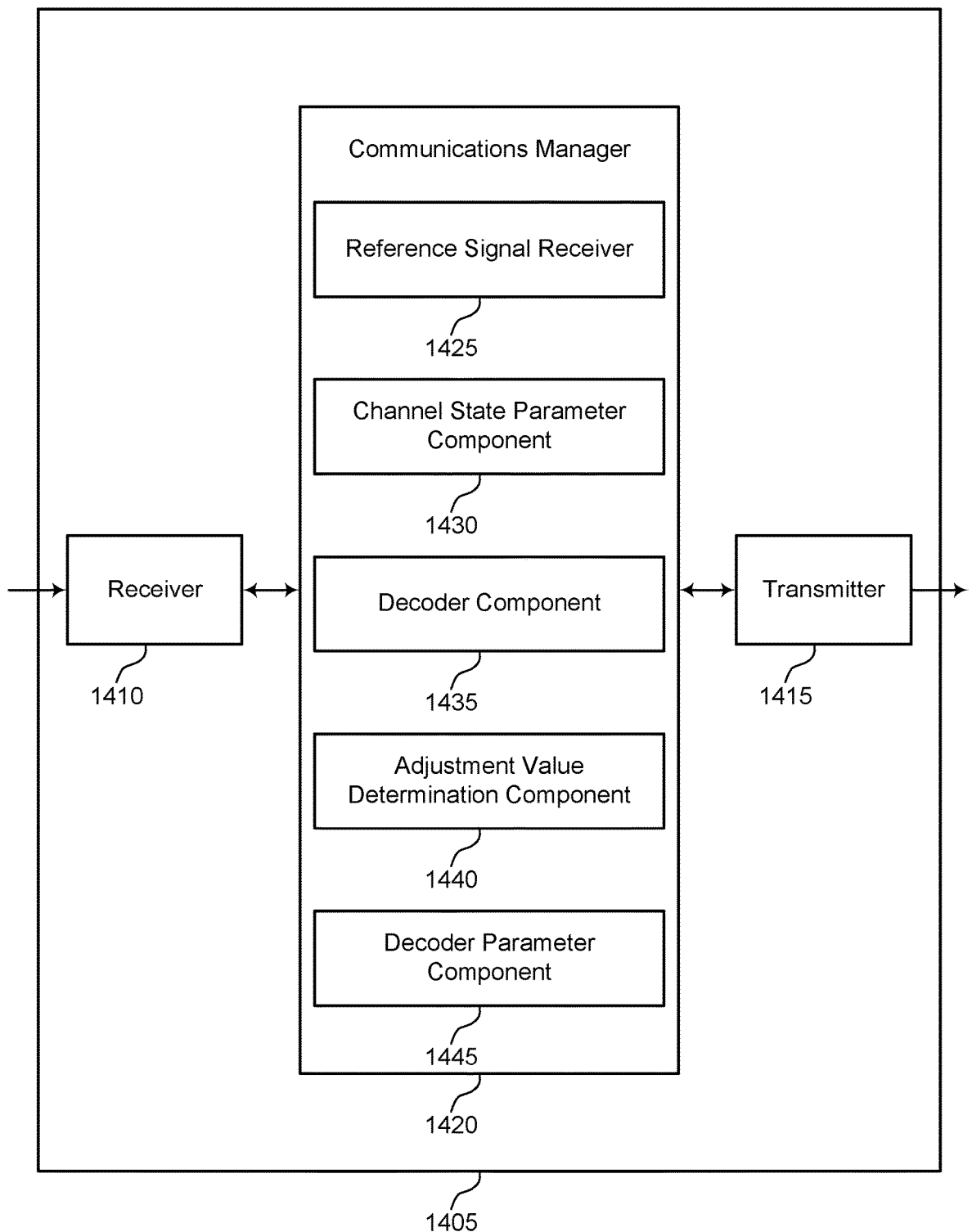

FIG. 14 shows a block diagram of a device 1405 that supports online adjustment for CSI in accordance with aspects of the present disclosure. The device 1405 may be an example of aspects of a device 1305 or a base station 105 as described herein. The device 1405 may include a receiver 1410, a transmitter 1415, and a communications manager 1420. The communications manager 1420 can be implemented, at least in part, by one or both of a modem and a processor. Each of these components may be in communication with one another (for example, via one or more buses).

The receiver 1410 may provide a means for receiving information such as packets, user data, control information, or any combination thereof associated with various information channels (for example, control channels, data channels, information channels related to online adjustment for CSI). Information may be passed on to other components of the device 1405. The receiver 1410 may utilize a single antenna or a set of multiple antennas.

The transmitter 1415 may provide a means for transmitting signals generated by other components of the device 1405. For example, the transmitter 1415 may transmit information such as packets, user data, control information, or any combination thereof associated with various information channels (for example, control channels, data channels, information channels related to online adjustment for CSI). In some examples, the transmitter 1415 may be co-located with a receiver 1410 in a transceiver component. The transmitter 1415 may utilize a single antenna or a set of multiple antennas.

The device 1405, or various components thereof, may be an example of means for performing various aspects of online adjustment for CSI as described herein. For example, the communications manager 1420 may include a reference signal receiver 1425, a channel state parameter component 1430, a decoder component 1435, an adjustment value determination component 1440, a decoder parameter component 1445, or any combination thereof. The communications manager 1420 may be an example of aspects of a communications manager 1320 as described herein. In some examples, the communications manager 1420, or various components thereof, may be configured to perform various operations (for example, receiving, monitoring, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to receive information, transmit information, or perform various other operations as described herein.

The communications manager 1420 may support wireless communications at a base station in accordance with examples as disclosed herein. The reference signal receiver 1425 may be configured as or otherwise support a means for receiving, from a UE, one or more SRSs for an uplink channel. The channel state parameter component 1430 may be configured as or otherwise support a means for measuring one or more first channel state parameters of the one or more SRSs. The decoder component 1435 may be configured as or otherwise support a means for decoding one or more uplink transmissions received from the UE. The adjustment value determination component 1440 may be configured as or otherwise support a means for determining, using one or more signal processing operations and based on one or more preprocessed decoder parameters, one or more adjustment values for the one or more first channel state parameters. The channel state parameter component 1430 may be configured as or otherwise support a means for transmitting, to the UE, the one or more adjustment values for the one or more first channel state parameters.

Additionally or alternatively, the communications manager 1420 may support wireless communications at a base station in accordance with examples as disclosed herein. The channel state parameter component 1430 may be configured as or otherwise support a means for determining one or more channel state parameters associated with one or more reference signals communicated over a channel. The decoder parameter component 1445 may be configured as or otherwise support a means for receiving, from a UE, a message including an indication of one or more preprocessed decoder parameters associated with a downlink channel decoder of the UE. The adjustment value determination component 1440 may be configured as or otherwise support a means for determining, based on the indication of the one or more preprocessed decoder parameters, one or more adjustment values associated with the one or more channel state parameters. The channel state parameter component 1430 may be configured as or otherwise support a means for transmitting, to the UE, a downlink transmission based on the one or more adjustment values associated with the one or more channel state parameters.

Figure 15:
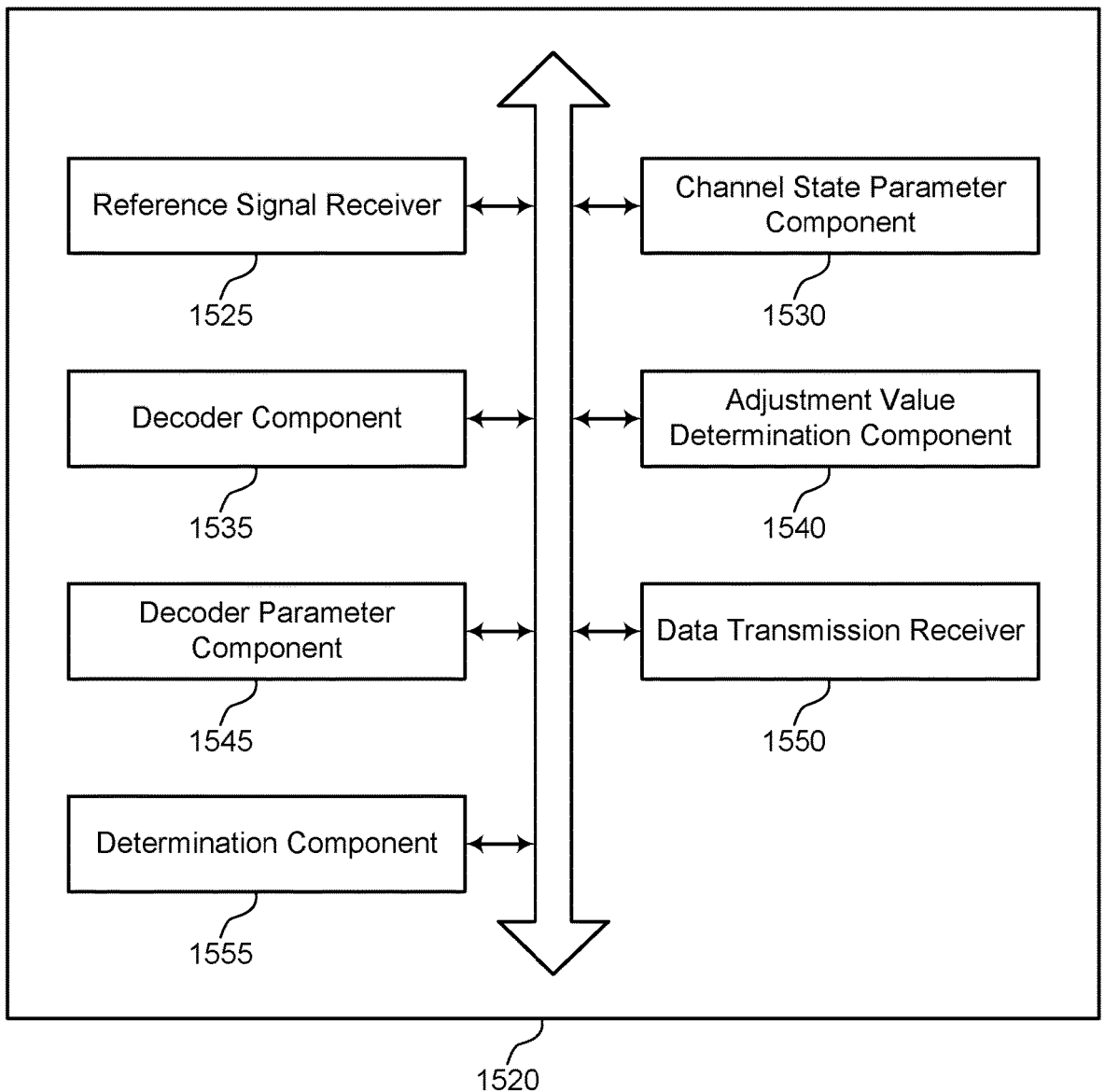
FIG. 15 shows a block diagram of a communications manager that supports online adjustment for CSI in accordance with aspects of the present disclosure.

FIG. 15 shows a block diagram 1500 of a communications manager 1520 that supports online adjustment for CSI in accordance with aspects of the present disclosure. The communications manager 1520, or various components thereof, may be an example of means for performing various aspects of online adjustment for CSI as described herein. For example, the communications manager 1520 may include a reference signal receiver 1525, a channel state parameter component 1530, a decoder component 1535, an adjustment value determination component 1540, a decoder parameter component 1545, a data transmission receiver 1550, a prediction component 1555, or any combination thereof. Each of these components may communicate, directly or indirectly, with one another (for example, via one or more buses).

The communications manager 1520 may support wireless communications at a base station in accordance with examples as disclosed herein. The reference signal receiver 1525 may be configured as or otherwise support a means for receiving, from a UE, one or more SRSs for an uplink channel. The channel state parameter component 1530 may be configured as or otherwise support a means for measuring one or more first channel state parameters of the one or more SRSs. The decoder component 1535 may be configured as or otherwise support a means for decoding one or more uplink transmissions received from the UE. The adjustment value determination component 1540 may be configured as or otherwise support a means for determining, using one or more signal processing operations and based on one or more preprocessed decoder parameters, one or more adjustment values for the one or more first channel state parameters. In some examples, the channel state parameter component 1530 may be configured as or otherwise support a means for transmitting, to the UE, the one or more adjustment values for the one or more first channel state parameters.

In some examples, the decoder parameter component 1545 may be configured as or otherwise support a means for receiving, from the UE, a message including an indication of the one or more preprocessed decoder parameters, where the one or more preprocessed decoder parameters are associated with a downlink channel decoder of the UE.

In some examples, transmitting the one or more adjustment values may include transmitting one or more second channel state parameters associated with the one or more SRSs, the one or more second channel state parameters including the one or more adjustment values. In some examples, the data transmission receiver 1550 may be configured as or otherwise support a means for receiving, from the UE, one or more uplink data transmissions based on the one or more second channel state parameters.

In some examples, to support determining the one or more adjustment values, the prediction component 1555 may be configured as or otherwise support a means for determining, using a first signal processing operation, that the one or more first channel state parameters may be adjusted to increase throughput based on the one or more preprocessed decoder parameters. In some examples, to support determining the one or more adjustment values, the adjustment value determination component 1540 may be configured as or otherwise support a means for determining, using a second signal processing operation, the one or more adjustment values for the one or more first channel state parameters.

Additionally or alternatively, the communications manager 1520 may support wireless communications at a base station in accordance with examples as disclosed herein. In some examples, the channel state parameter component 1530 may be configured as or otherwise support a means for determining one or more channel state parameters associated with one or more reference signals communicated over a channel. The decoder parameter component 1545 may be configured as or otherwise support a means for receiving, from a UE, a message including an indication of one or more preprocessed decoder parameters associated with a downlink channel decoder of the UE. In some examples, the adjustment value determination component 1540 may be configured as or otherwise support a means for determining, based on the indication of the one or more preprocessed decoder parameters, one or more adjustment values associated with the one or more channel state parameters. In some examples, the channel state parameter component 1530 may be configured as or otherwise support a means for transmitting, to the UE, a downlink transmission based on the one or more adjustment values associated with the one or more channel state parameters.

In some examples, determining the one or more adjustment values associated with the one or more channel state parameters includes using one or more signal processing operations. In some examples, the downlink transmission is based on one or more second channel state parameters for the one or more reference signals, the one or more second channel state parameters including the one or more adjustment values associated with the one or more channel state parameters.

In some examples, to support determining the one or more adjustment values, the prediction component 1555 may be configured as or otherwise support a means for determining, using a first signal processing operation, that the one or more channel state parameters may be adjusted to improve throughput based on the one or more preprocessed decoder parameters. In some examples, to support determining the one or more adjustment values, the adjustment value determination component 1540 may be configured as or otherwise support a means for determining, using a second signal processing operation, the one or more adjustment values associated with the one or more channel state parameters.

In some examples, the first signal processing operation includes a machine learning operation, and the second signal processing operation includes a machine learning operation.

In some examples, determining that the one or more channel state parameters may be adjusted includes using a machine learning operation implemented by a neural network operation to determine that an MCS that is higher than a granted MCS associated with communications over the channel passes a CRC.

In some examples, determining the one or more adjustment values includes using a machine learning operation implemented by an online iterative process to calculate one or more expected SE values for one or more respective MCSs associated with communications over the channel.

In some examples, determining the one or more adjustment values includes setting a target spectrum efficiency based on the one or more respective MCSs. In some examples, the one or more respective MCSs include a granted MCS, an MCS that is higher than the granted MCS, and an MCS that is lower than the granted MCS.

In some examples, the one or more reference signals include one or more CSI-RSs, the method further including transmitting, to the UE, the one or more CSI-RSs. In some examples, determining one or more channel state parameters is based on transmitting the one or more CSI-RSs.

In some examples, the one or more reference signals include one or more SRSs, the method further including receiving, from the UE, the one or more SRSs. In some examples, determining one or more channel state parameters is based on receiving the one or more SRSs and measuring the one or more SRSs.

In some examples, receiving the message including an indication of the one or more preprocessed decoder parameters includes receiving the one or more preprocessed decoder parameters including one or more statistical values of one or more decoder metrics.

Figure 16:
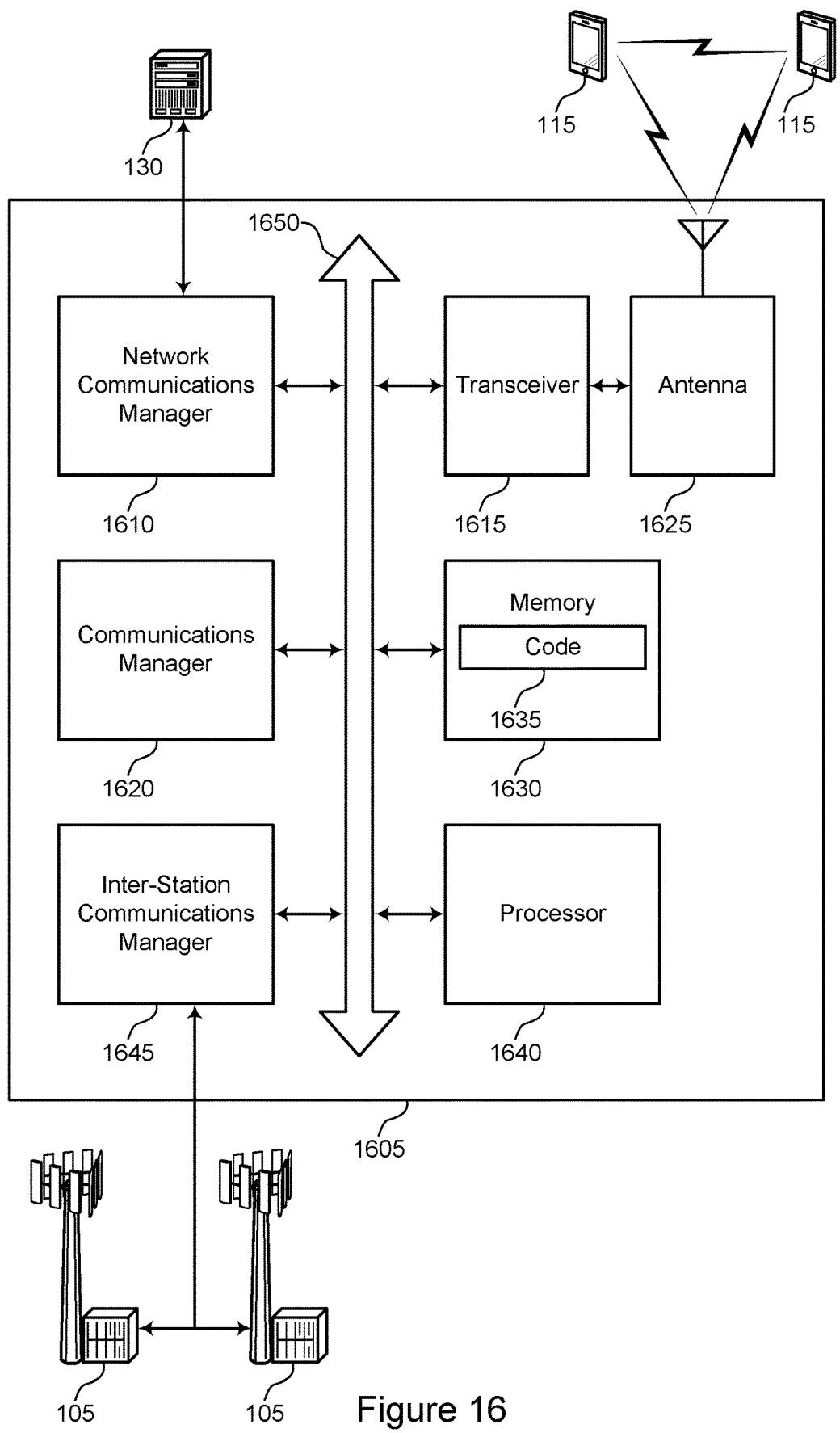
FIG. 16 shows a diagram of a system including a device that supports online adjustment for CSI in accordance with aspects of the present disclosure.

FIG. 16 shows a diagram of a system 1600 including a device 1605 that supports online adjustment for CSI in accordance with aspects of the present disclosure. The device 1605 may be an example of or include the components of a device 1305, a device 1405, or a base station 105 as described herein. The device 1605 may communicate wirelessly with one or more base stations 105, UEs 115, or any combination thereof. The device 1605 may include components for bi-directional voice and data communications including components for transmitting and receiving communications, such as a communications manager 1620, a network communications manager 1610, a transceiver 1615, an antenna 1625, a memory 1630, code 1635, a processor 1640, and an inter-station communications manager 1645. These components may be in electronic communication or otherwise coupled (for example, operatively, communicatively, functionally, electronically, electrically) via one or more buses (for example, a bus 1650).

The network communications manager 1610 may manage communications with a core network 130 (for example, via one or more wired backhaul links). For example, the network communications manager 1610 may manage the transfer of data communications for client devices, such as one or more UEs 115.

In some examples, the device 1605 may include a single antenna 1625. However, in some other examples the device

1605 may have more than one antenna 1625, which may be capable of concurrently transmitting or receiving multiple wireless transmissions. The transceiver 1615 may communicate bi-directionally, via the one or more antennas 1625, wired, or wireless links as described herein. For example, the transceiver 1615 may represent a wireless transceiver and may communicate bi-directionally with another wireless transceiver. The transceiver 1615 may also include a modem to modulate the packets, to provide the modulated packets to one or more antennas 1625 for transmission, and to demodulate packets received from the one or more antennas 1625. The transceiver 1615, or the transceiver 1615 and one or more antennas 1625, may be an example of a transmitter 1315, a transmitter 1415, a receiver 1310, a receiver 1410, or any combination thereof or component thereof, as described herein.

The memory 1630 may include RAM and ROM. The memory 1630 may store computer-readable, computer-executable code 1635 including instructions that, when executed by the processor 1640, cause the device 1605 to perform various functions described herein. The code 1635 may be stored in a non-transitory computer-readable medium such as system memory or another type of memory. In some examples, the code 1635 may not be directly executable by the processor 1640 but may cause a computer (for example, when compiled and executed) to perform functions described herein. In some examples, the memory 1630 may contain, among other things, a BIOS which may control basic hardware or software operation such as the interaction with peripheral components or devices.

The processor 1640 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1640 may be configured to operate a memory array using a memory controller. In some other examples, a memory controller may be integrated into the processor 1640. The processor 1640 may be configured to execute computer-readable instructions stored in a memory (for example, the memory 1630) to cause the device 1605 to perform various functions (for example, functions or tasks supporting online adjustment for CSI). For example, the device 1605 or a component of the device 1605 may include a processor 1640 and memory 1630 coupled to the processor 1640, the processor 1640 and memory 1630 configured to perform various functions described herein.

The inter-station communications manager 1645 may manage communications with other base stations 105, and may include a controller or scheduler for controlling communications with UEs 115 in cooperation with other base stations 105. For example, the inter-station communications manager 1645 may coordinate scheduling for transmissions to UEs 115 for various interference mitigation techniques such as beamforming or joint transmission. In some examples, the inter-station communications manager 1645 may provide an X2 interface within an LTE/LTE-A wireless communications network technology to provide communication between base stations 105.

The communications manager 1620 may support wireless communications at a base station in accordance with examples as disclosed herein. For example, the communications manager 1620 may be configured as or otherwise support a means for receiving, from a UE, one or more SRSs for an uplink channel. The communications manager 1620 may be configured as or otherwise support a means for measuring one or more first channel state parameters of the one or more SRSs. The communications manager 1620 may be configured as or otherwise support a means for decoding one or more uplink transmissions received from the UE. The communications manager 1620 may be configured as or otherwise support a means for determining, using one or more signal processing operations and based on one or more preprocessed decoder parameters, one or more adjustment values for the one or more first channel state parameters. The communications manager 1620 may be configured as or otherwise support a means for transmitting, to the UE, the one or more adjustment values for the one or more first channel state parameters.

Additionally or alternatively, the communications manager 1620 may support wireless communications at a base station in accordance with examples as disclosed herein. For example, the communications manager 1620 may be configured as or otherwise support a means for determining one or more channel state parameters associated with one or more reference signals communicated over a channel. The communications manager 1620 may be configured as or otherwise support a means for receiving, from a UE, a message including an indication of one or more preprocessed decoder parameters associated with a downlink channel decoder of the UE. The communications manager 1620 may be configured as or otherwise support a means for determining, based on the indication of the one or more preprocessed decoder parameters, one or more adjustment values associated with the one or more channel state parameters. The communications manager 1620 may be configured as or otherwise support a means for transmitting, to the UE, a downlink transmission based on the one or more adjustment values associated with the one or more channel state parameters.

By including or configuring the communications manager 1620 in accordance with examples as described herein, the device 1605 may support techniques for reducing latency in communications and increasing throughput of data transmissions. For example, by leveraging one or more signal processing operations, the device 1605 may iteratively adjust one or more channel state parameters to increase accuracy in CSI, which may result in more robust communications, reduced latency, and improved coordination between devices.

In some examples, the communications manager 1620 may be configured to perform various operations (for example, receiving, monitoring, transmitting) using or otherwise in cooperation with the transceiver 1615, the one or more antennas 1625, or any combination thereof. Although the communications manager 1620 is illustrated as a separate component, in some examples, one or more functions described with reference to the communications manager 1620 may be supported by or performed by the processor 1640, the memory 1630, the code 1635, or any combination thereof. For example, the code 1635 may include instructions executable by the processor 1640 to cause the device 1605 to perform various aspects of online adjustment for CSI as described herein, or the processor 1640 and the memory 1630 may be otherwise configured to perform or support such operations.

Figure 17:
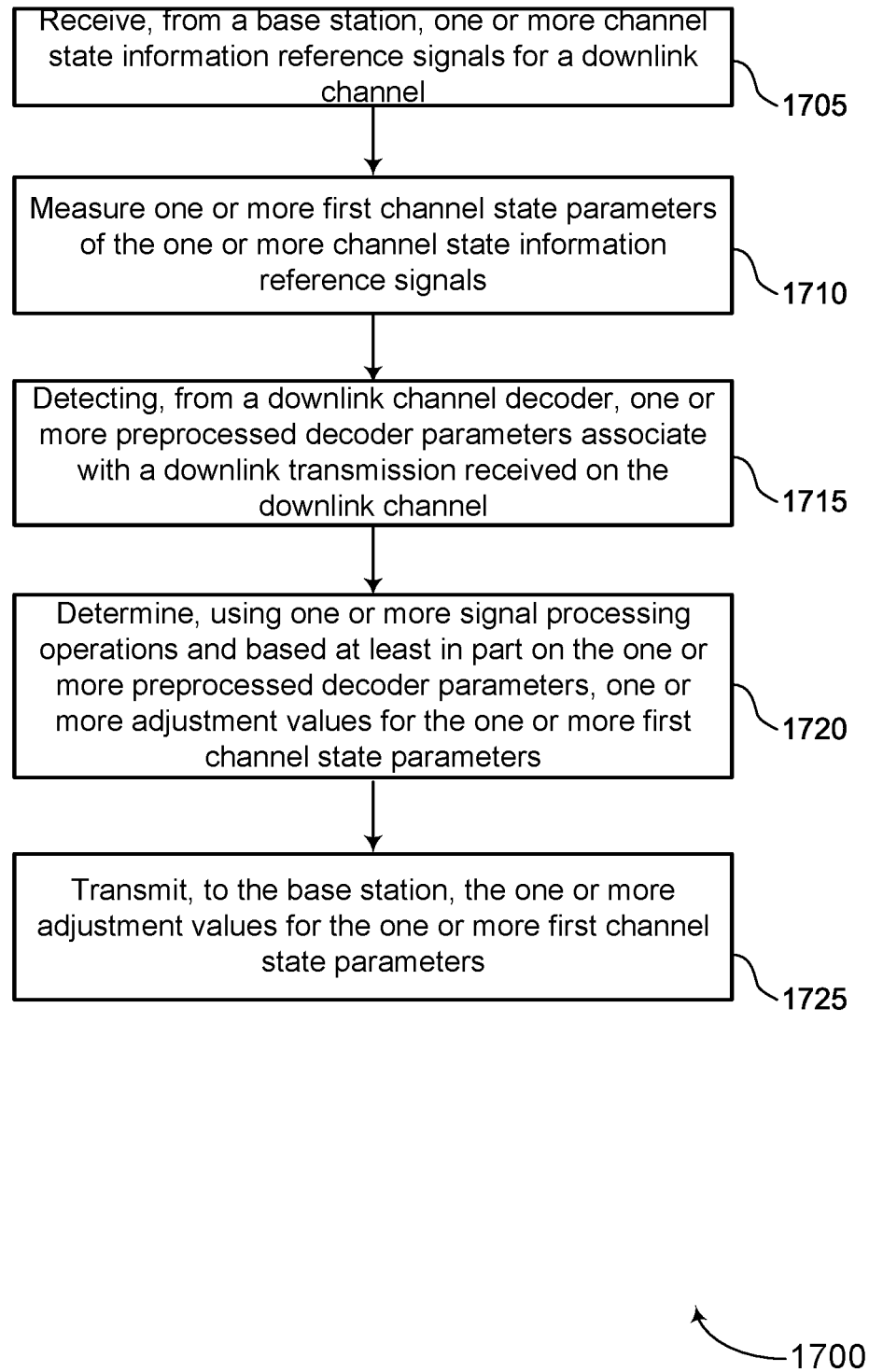
FIGS. 17-20 show flowcharts illustrating methods that support online adjustment for CSI in accordance with aspects of the present disclosure.

FIG. 17 shows a flowchart illustrating a method 1700 that supports online adjustment for CSI in accordance with aspects of the present disclosure. The operations of the method 1700 may be implemented by a UE or its components as described herein. For example, the operations of the method 1700 may be performed by a UE 115 as described with reference to FIGS. 1-12. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, one or more CSI-RSs for a downlink channel. The operations of 1705 may be performed in accordance with examples as disclosed herein. In some examples, aspects of the operations of 1705 may be performed by a reference signal receiver 1125 as described with reference to FIG. 11.

At 1710, the method may include measuring one or more first channel state parameters of the one or more CSI-RSs. The operations of 1710 may be performed in accordance with examples as disclosed herein. In some examples, aspects of the operations of 1710 may be performed by a channel state parameter component 1130 as described with reference to FIG. 11.

At 1715, the method may include detecting, from a downlink channel decoder, one or more preprocessed decoder parameters associated with a downlink transmission received on the downlink channel. The operations of 1715 may be performed in accordance with examples as disclosed herein. In some examples, aspects of the operations of 1715 may be performed by a decoder parameter component 1135 as described with reference to FIG. 11.

At 1720, the method may include determining, using one or more signal processing operations and based on the one or more preprocessed decoder parameters, one or more adjustment values for the one or more first channel state parameters. The operations of 1720 may be performed in accordance with examples as disclosed herein. In some examples, aspects of the operations of 1720 may be performed by an adjustment value determination component 1140 as described with reference to FIG. 11.

At 1725, the method may include transmitting, to the base station, the one or more adjustment values for the one or more first channel state parameters. The operations of 1725 may be performed in accordance with examples as disclosed herein. In some examples, aspects of the operations of 1725 may be performed by a channel state parameter component 1130 as described with reference to FIG. 11.

Figure 18:
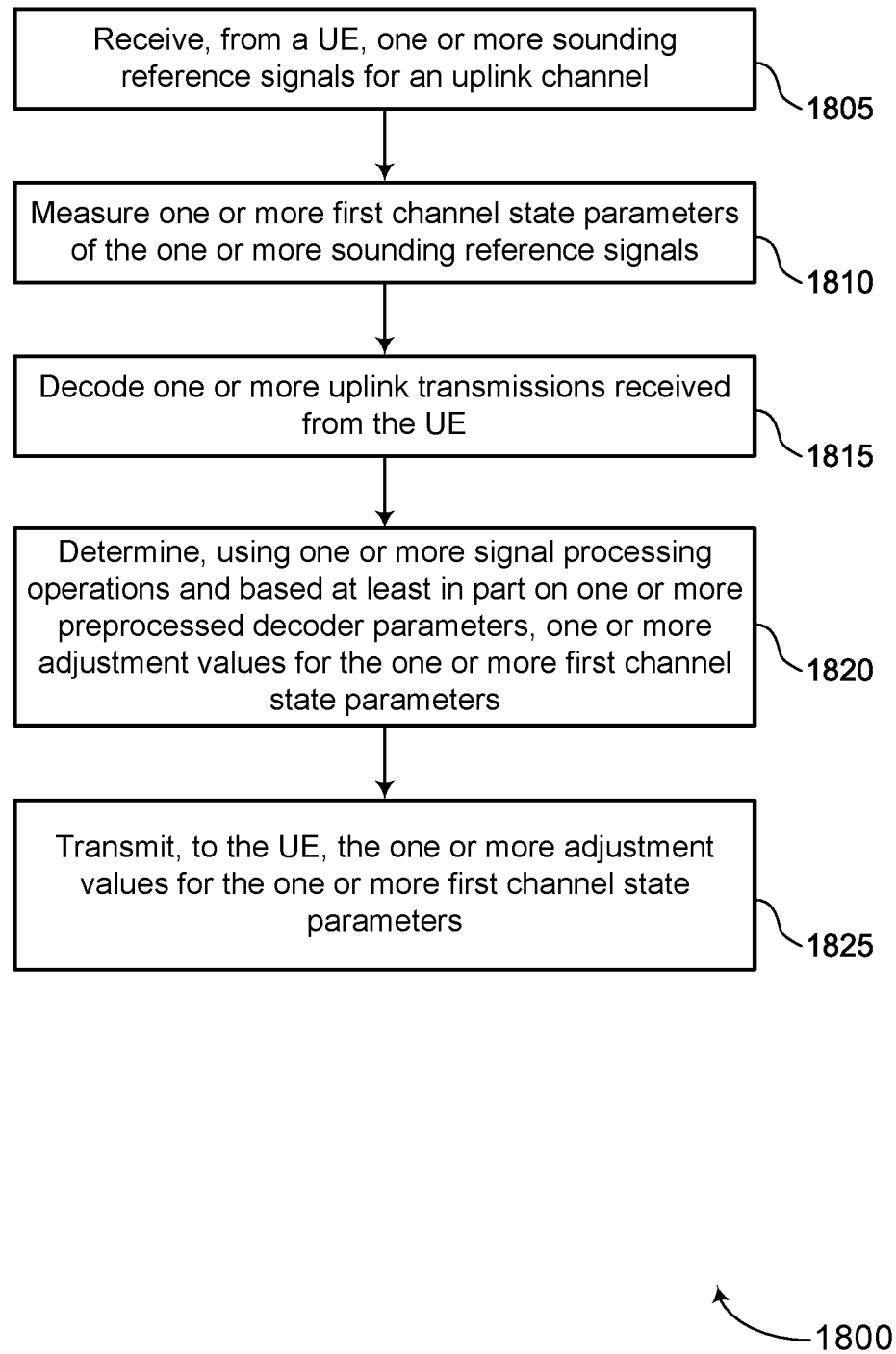

FIG. 18 shows a flowchart illustrating a method 1800 that supports online adjustment for CSI in accordance with aspects of the present disclosure. The operations of the method 1800 may be implemented by a base station or its components as described herein. For example, the operations of the method 1800 may be performed by a base station 105 as described with reference to FIGS. 1-12. In some examples, a base station may execute a set of instructions to control the functional elements of the base station to perform the described functions. Additionally or alternatively, the base station may perform aspects of the described functions using special-purpose hardware.

At 1805, the method may include receiving, from a UE, one or more SRSs for an uplink channel. The operations of 1805 may be performed in accordance with examples as disclosed herein. In some examples, aspects of the operations of 1805 may be performed by a reference signal receiver 1525 as described with reference to FIG. 15.

At 1810, the method may include measuring one or more first channel state parameters of the one or more SRSs. The operations of 1810 may be performed in accordance with examples as disclosed herein. In some examples, aspects of the operations of 1810 may be performed by a channel state parameter component 1530 as described with reference to FIG. 15.

At 1815, the method may include decoding one or more uplink transmissions received from the UE. The operations of 1815 may be performed in accordance with examples as disclosed herein. In some examples, aspects of the operations of 1815 may be performed by a decoder component 1535 as described with reference to FIG. 15.

At 1820, the method may include determining, using one or more signal processing operations and based on the one or more preprocessed decoder parameters, one or more adjustment values for the one or more first channel state parameters. The operations of 1820 may be performed in accordance with examples as disclosed herein. In some examples, aspects of the operations of 1820 may be performed by an adjustment value determination component 1540 as described with reference to FIG. 15.

At 1825, the method may include transmitting, to the UE, the one or more adjustment values for the one or more first channel state parameters. The operations of 1825 may be performed in accordance with examples as disclosed herein. In some examples, aspects of the operations of 1825 may be performed by a channel state parameter component 1530 as described with reference to FIG. 15.

Figure 19:
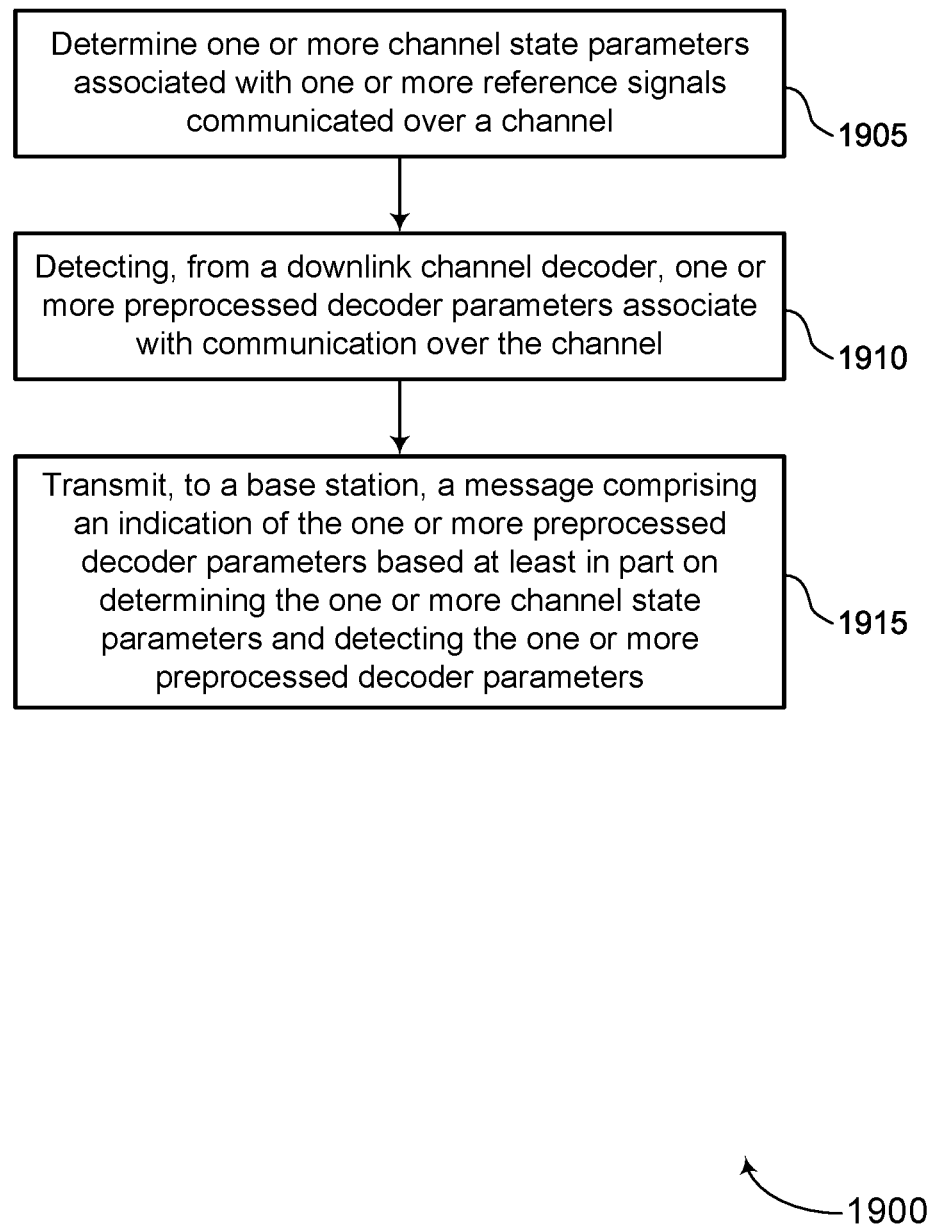

FIG. 19 shows a flowchart illustrating a method 1900 that supports online adjustment for CSI in accordance with aspects of the present disclosure. The operations of the method 1900 may be implemented by a UE or its components as described herein. For example, the operations of the method 1900 may be performed by a UE 115 as described with reference to FIGS. 1-8 and 13-16. In some examples, a UE may execute a set of instructions to control the functional elements of the UE to perform the described functions. Additionally or alternatively, the UE may perform aspects of the described functions using special-purpose hardware.

At 1905, the method may include determining one or more channel state parameters associated with one or more reference signals communicated over a channel. The operations of 1905 may be performed in accordance with examples as disclosed herein. In some examples, aspects of the operations of 1905 may be performed by a channel state parameter component 1130 as described with reference to FIG. 11.

At 1910, the method may include detecting, from a downlink channel decoder, one or more preprocessed decoder parameters associated with communication over the channel. The operations of 1910 may be performed in accordance with examples as disclosed herein. In some examples, aspects of the operations of 1910 may be performed by a decoder parameter component 1135 as described with reference to FIG. 11.

At 1915, the method may include transmitting, to a base station, a message including an indication of the one or more preprocessed decoder parameters based on determining the one or more channel state parameters and detecting the one or more preprocessed decoder parameters. The operations of 1915 may be performed in accordance with examples as disclosed herein. In some examples, aspects of the operations of 1915 may be performed by a decoder parameter component 1135 as described with reference to FIG. 11.

Figure 20:
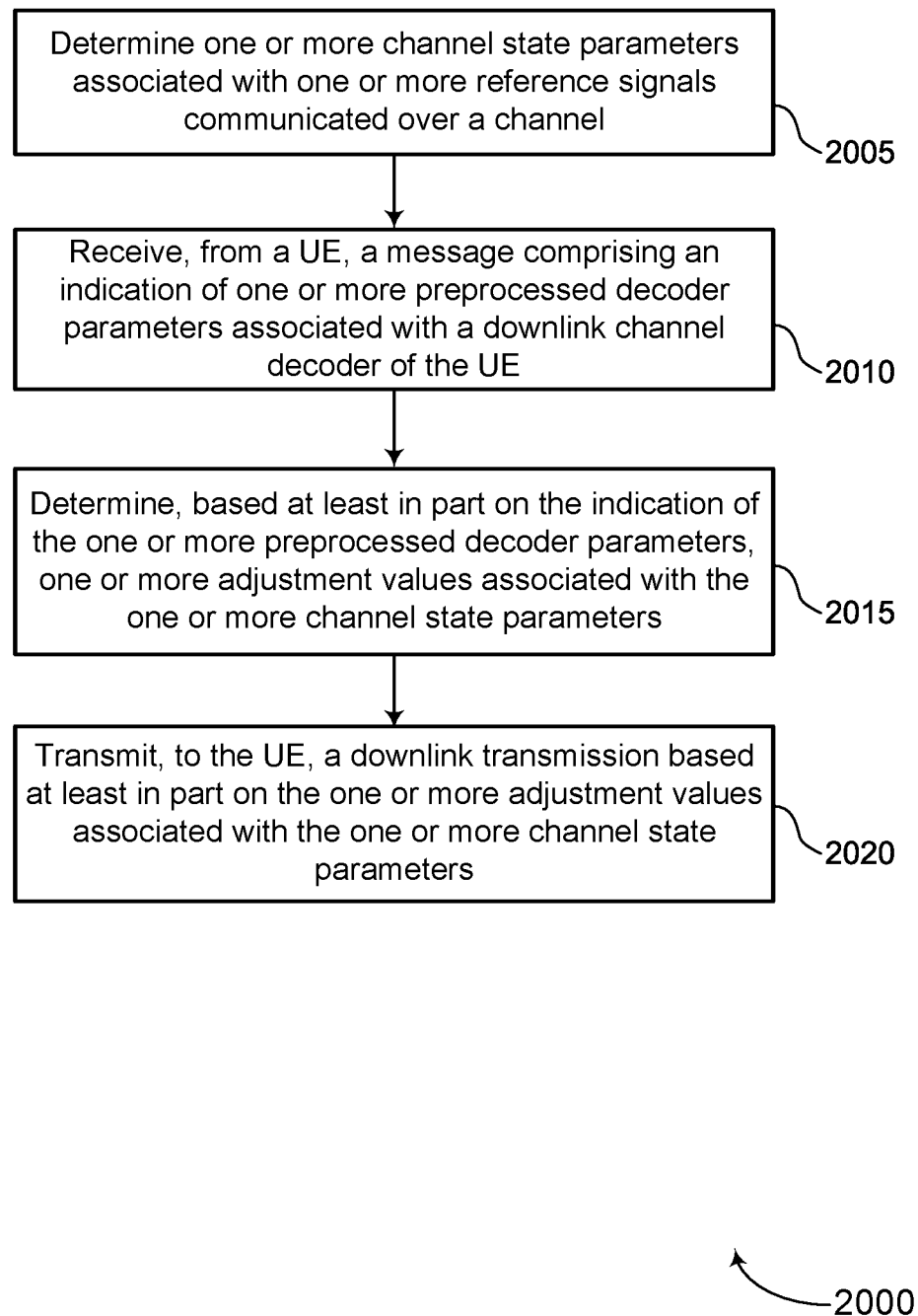

FIG. 20 shows a flowchart illustrating a method 2000 that supports online adjustment for CSI in accordance with aspects of the present disclosure. The operations of the method 2000 may be implemented by a base station or its components as described herein. For example, the operations of the method 2000 may be performed by a base station 105 as described with reference to FIGS. 1-12. In some examples, a base station may execute a set of instructions to control the functional elements of the base station to perform the described functions. Additionally or alternatively, the base station may perform aspects of the described functions using special-purpose hardware.

At 2005, the method may include determining one or more channel state parameters associated with one or more reference signals communicated over a channel. The operations of 2005 may be performed in accordance with examples as disclosed herein. In some examples, aspects of the operations of 2005 may be performed by a channel state parameter component 1530 as described with reference to FIG. 15.

At 2010, the method may include receiving, from a UE, a message including an indication of one or more preprocessed decoder parameters associated with a downlink channel decoder of the UE. The operations of 2010 may be performed in accordance with examples as disclosed herein. In some examples, aspects of the operations of 2010 may be performed by a decoder parameter component 1545 as described with reference to FIG. 15.

At 2015, the method may include determining, based on the indication of the one or more preprocessed decoder parameters, one or more adjustment values associated with the one or more channel state parameters. The operations of 2015 may be performed in accordance with examples as disclosed herein. In some examples, aspects of the operations of 2015 may be performed by an adjustment value determination component 1540 as described with reference to FIG. 15.

At 2020, the method may include transmitting, to the UE, a downlink transmission based on the one or more adjustment values associated with the one or more channel state parameters. The operations of 2020 may be performed in accordance with examples as disclosed herein. In some examples, aspects of the operations of 2020 may be performed by a channel state parameter component 1530 as described with reference to FIG. 15.

The following provides an overview of aspects of the present disclosure:

Aspect 1: A method for wireless communications at a UE, comprising: receiving, from a base station, one or more CSI-RSs for a downlink channel; measuring one or more first channel state parameters of the one or more CSI-RSs; detecting, from a downlink channel decoder, one or more preprocessed decoder parameters associated with a downlink transmission received on the downlink channel; determining, using one or more signal processing operations and based at least in part on the one or more preprocessed decoder parameters, one or more adjustment values for the one or more first channel state parameters; and transmitting, to the base station, one or more second channel state parameters associated with the one or more CSI-RSs, the one or more second channel state parameters comprising the one or more adjustment values for the one or more first channel state parameters.

Aspect 2: The method of aspect 1, wherein transmitting the one or more adjustment values comprises transmitting one or more second channel state parameters associated with the one or more CSI-RSs, the one or more second channel state parameters comprising the one or more adjustment values, the method further comprising: receiving, from the base station, one or more downlink data transmissions based at least in part on the one or more second channel state parameters.

Aspect 3: The method of aspect 1 or 2 wherein determining the one or more adjustment values comprises: determining, using a first signal processing operation, that the one or more first channel state parameters can be adjusted to increase throughput based at least in part on the one or more preprocessed decoder parameters; and determining, using a second signal processing operation, the one or more adjustment values for the one or more first channel state parameters.

Aspect 5: The method of aspect 3, wherein the first signal processing operation comprises a first machine learning operation, and the second signal processing operation comprises a second machine learning operation.

Aspect 6: The method of any of aspects 3 through 5, wherein determining that the one or more first channel state parameters can be adjusted comprises using a machine learning operation implemented by a neural network operation to determine that an MCS that is higher than a granted MCS associated with the downlink transmission passes a CRC.

Aspect 7: The method of any of aspects 3 through 6, wherein determining the one or more adjustment values comprises using a machine learning operation implemented by an online iterative process to calculate one or more expected spectral efficiency values for one or more respective MCSs associated with the downlink transmission.

Aspect 8: The method of aspect 7, wherein determining the one or more adjustment values comprises setting a target spectrum efficiency based at least in part on the one or more respective MCSs, and the one or more respective MCSs comprise a granted MCS, an MCS that is lower than the granted MCS, and an MCS that is higher than the granted MCS.

Aspect 9: The method of any of aspects 7 through 8, wherein transmitting the one or more adjustment values comprises transmitting a channel state information report comprising the one or more adjustment values, the one or more adjustment values being based at least in part on at least one of the one or more expected spectral efficiency values.

Aspect 10: The method of any of aspects 1 through 9, wherein the one or more preprocessed decoder parameters comprise one or more statistical values of one or more decoder metrics.

Aspect 11: The method of any of aspects 1 through 10, wherein detecting the one or more preprocessed decoder parameters comprises detecting the one or more preprocessed decoder parameters for each slot of the downlink transmission.

Aspect 12: A method for wireless communications at a base station, comprising: receiving, from a UE, one or more SRSs for an uplink channel; measuring one or more first channel state parameters of the one or more SRSs; decoding one or more uplink transmissions received from the UE; determining, using one or more signal processing operations and based at least in part on one or more preprocessed decoder parameters, one or more adjustment values for the one or more first channel state parameters; and transmitting, to the UE, the one or more adjustment values for the one or more first channel state parameters.

Aspect 13: The method of aspect 12, wherein transmitting the one or more adjustment values comprises transmitting one or more second channel state parameters associated with the one or more sounding reference signals, the one or more second channel state parameters comprising the one or more adjustment values, the method further comprising: receiving, from the UE, one or more uplink data transmissions based at least in part on the one or more second channel state parameters.

Aspect 14: The method of any of aspects 12 through 13, wherein determining the one or more adjustment values comprises: determining, using a first signal processing operation, that the one or more first channel state parameters can be adjusted to increase throughput based at least in part on the one or more preprocessed decoder parameters; and determining, using a second signal processing operation, the one or more adjustment values for the one or more first channel state parameters.

Aspect 15: A method for wireless communication at a UE, comprising: determining one or more channel state parameters associated with one or more reference signals communicated over a channel; detecting, from a downlink channel decoder, one or more preprocessed decoder parameters associated with communication over the channel; and transmitting, to a base station, a message comprising an indication of the one or more preprocessed decoder parameters based at least in part on determining the one or more channel state parameters and detecting the one or more preprocessed decoder parameters.

Aspect 16: The method of aspect 15, further comprising: determining, using one or more signal processing operations, that the one or more channel state parameters can be adjusted to increase throughput based at least in part on the one or more preprocessed decoder parameters, wherein transmitting the message comprises transmitting an indication of the determining.

Aspect 17: The method of aspect 16, wherein determining that the one or more channel state parameters can be adjusted comprises using a machine learning operation implemented by a neural network operation to determine that a MCS that is higher than a granted MCS associated with communications over the channel passes a CRC.

Aspect 18: The method of any of aspects 16 through 17, wherein transmitting the indication of the determining comprises transmitting a quantized report that includes a negative acknowledgement or a positive acknowledgement.

Aspect 19: The method of any of aspects 15 through 18, wherein the one or more reference signals comprise one or more CSI-RSs, the method further comprising receiving, from the base station, the one or more CSI-RSs, determining one or more channel state parameters is based at least in part on receiving the one or more CSI-RSs and measuring the one or more CSI-RSs.

Aspect 20: The method of any of aspects 15 through 19, wherein the one or more reference signals comprise one or more SRSs, the method further comprising transmitting, to the base station, the one or more SRSs, determining one or more channel state parameters is based at least in part on transmitting the one or more SRSs.

Aspect 21: The method of any of aspects 15 through 20, wherein transmitting the indication of the one or more preprocessed decoder parameters comprises transmitting the one or more preprocessed decoder parameters comprising one or more statistics of one or more decoder metrics.

Aspect 22: A method for wireless communications at a base station, comprising: determining one or more channel state parameters associated with one or more reference signals communicated over a channel; receiving, from a UE, a message comprising an indication of one or more preprocessed decoder parameters associated with a downlink channel decoder of the UE; determining, based at least in part on the indication of the one or more preprocessed decoder parameters, one or more adjustment values associated with the one or more channel state parameters; and transmitting, to the UE, a downlink transmission based at least in part on the one or more adjustment values associated with the one or more channel state parameters.

Aspect 23: The method of aspect 22, wherein determining the one or more adjustment values associated with the one or more channel state parameters comprises using one or more signal processing operations, and the downlink transmission is based at least in part on one or more second channel state parameters for the one or more reference signals, the one or more second channel state parameters comprising the one or more adjustment values associated with the one or more channel state parameters.

Aspect 24: The method of any of aspects 22 through 23, wherein determining the one or more adjustment values comprises: determining, using a first signal processing operation, that the one or more channel state parameters can be adjusted to increase throughput based at least in part on the one or more preprocessed decoder parameters; and determining, using a second signal processing operation, the one or more adjustment values associated with the one or more channel state parameters.

Aspect 25: The method of aspect 24, wherein the first signal processing operation comprises a machine learning operation, and the second signal processing operation comprises a machine learning operation.

Aspect 26: The method of any of aspects 24 through 25, wherein determining that the one or more channel state parameters can be adjusted comprises using a machine learning operation implemented by a neural network operation to determine that an MCS that is higher than a granted MCS associated with communications over the channel passes a CRC.

Aspect 27: The method of any of aspects 24 through 26, wherein determining the one or more adjustment values comprises using a machine learning operation implemented by an online iterative process to calculate one or more expected spectral efficiency values for one or more respective MCSs associated with communications over the channel.

Aspect 28: The method of aspect 27, wherein determining the one or more adjustment values comprises setting a target spectrum efficiency based at least in part on the one or more respective MCSs, and the one or more respective MCSs comprise a granted MCS, an MCS that is higher than the granted MCS, and an MCS that is lower than the granted MCS.

Aspect 29: The method of any of aspects 22 through 28, wherein the one or more reference signals comprise one or more CSI-RSs, the method further comprising transmitting, to the UE, the one or more CSI-RSs, determining one or more channel state parameters is based at least in part on transmitting the one or more CSI-RSs.

Aspect 30: The method of any of aspects 22 through 29, wherein the one or more reference signals comprise one or more SRSs, the method further comprising receiving, from the UE, the one or more SRSs, determining one or more channel state parameters is based at least in part on receiving the one or more SRSs and measuring the one or more SRSs.

Aspect 31: The method of any of aspects 22 through 30, wherein receiving the message comprising an indication of the one or more preprocessed decoder parameters comprises receiving the one or more preprocessed decoder parameters comprising one or more statistical values of one or more decoder metrics.

Aspect 32: An apparatus for wireless communications at a UE, comprising a processor; memory coupled with the processor; and instructions stored in the memory and executable by the processor to cause the apparatus to perform a method of any of aspects 1 through 11.

Aspect 33: An apparatus for wireless communications at a UE, comprising at least one means for performing a method of any of aspects 1 through 11.

Aspect 34: A non-transitory computer-readable medium storing code for wireless communications at a UE, the code comprising instructions executable by a processor to perform a method of any of aspects 1 through 11.

Aspect 35: An apparatus for wireless communications at a base station, comprising a processor; memory coupled with the processor; and instructions stored in the memory and executable by the processor to cause the apparatus to perform a method of any of aspects 12 through 14.

Aspect 36: An apparatus for wireless communications at a base station, comprising at least one means for performing a method of any of aspects 12 through 14.

Aspect 37: A non-transitory computer-readable medium storing code for wireless communications at a base station, the code comprising instructions executable by a processor to perform a method of any of aspects 12 through 14.

Aspect 38: An apparatus for wireless communication at a UE, comprising a processor; memory coupled with the processor; and instructions stored in the memory and executable by the processor to cause the apparatus to perform a method of any of aspects 15 through 21.

Aspect 39: An apparatus for wireless communication at a UE, comprising at least one means for performing a method of any of aspects 15 through 21.

Aspect 40: A non-transitory computer-readable medium storing code for wireless communication at a UE, the code comprising instructions executable by a processor to perform a method of any of aspects 15 through 21.

Aspect 41: An apparatus for wireless communications at a base station, comprising a processor; memory coupled with the processor; and instructions stored in the memory and executable by the processor to cause the apparatus to perform a method of any of aspects 22 through 31.

Aspect 42: An apparatus for wireless communications at a base station, comprising at least one means for performing a method of any of aspects 22 through 31.

Aspect 43: A non-transitory computer-readable medium storing code for wireless communications at a base station, the code comprising instructions executable by a processor to perform a method of any of aspects 22 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a network device, one or more channel state information reference signals for a downlink channel;
   measuring one or more first channel state parameters of the one or more channel state information reference signals;
   detecting, from a downlink channel decoder of the UE, one or more preprocessed decoder parameters associated with the downlink channel decoder of the UE, the one or more preprocessed decoder parameters being detected based at least in part on decoding a downlink transmission received on the downlink channel;
   determining, using one or more signal processing operations and based at least in part on the one or more preprocessed decoder parameters, one or more adjustment values for the one or more first channel state parameters; and
   transmitting, to the network device, the one or more adjustment values for the one or more first channel state parameters.

2. The method of claim 1, wherein transmitting the one or more adjustment values comprises transmitting one or more second channel state parameters associated with the one or more channel state information reference signals, the one or more second channel state parameters comprising the one or more adjustment values, the method further comprising:
   receiving, from the network device, one or more downlink data transmissions based at least in part on the one or more second channel state parameters.

3. The method of claim 1, wherein determining the one or more adjustment values comprises: determining, using a first signal processing operation, that the one or more first channel state parameters is adjusted to increase throughput based at least in part on the one or more preprocessed decoder parameters; and determining, using a second signal processing operation, the one or more adjustment values for the one or more first channel state parameters.

4. The method of claim 3, wherein the first signal processing operation comprises a first machine learning operation, and the second signal processing operation comprises a second machine learning operation.

5. The method of claim 3, wherein determining that the one or more first channel state parameters is adjusted comprises using a machine learning operation implemented by a neural network operation to determine that a modulation and coding scheme that is higher than a granted modulation and coding scheme associated with the downlink transmission passes a cyclic redundancy check.

6. The method of claim 3, wherein determining the one or more adjustment values comprises using a machine learning operation implemented by an online iterative process to calculate one or more expected spectral efficiency values for one or more respective modulation and coding schemes associated with the downlink transmission.

7. The method of claim 6, wherein:
   determining the one or more adjustment values comprises setting a target spectrum efficiency based at least in part on the one or more respective modulation and coding schemes, and
   the one or more respective modulation and coding schemes comprise a granted modulation and coding scheme, a modulation and coding scheme that is lower than the granted modulation and coding scheme, and a modulation and coding scheme that is higher than the granted modulation and coding scheme.

8. The method of claim 6, wherein transmitting the one or more adjustment values comprises transmitting a channel state information report comprising the one or more adjustment values, the one or more adjustment values being based at least in part on at least one of the one or more expected spectral efficiency values.

9. The method of claim 1, wherein the one or more preprocessed decoder parameters comprise one or more statistical values of one or more decoder metrics.

10. The method of claim 1, wherein detecting the one or more preprocessed decoder parameters comprises detecting the one or more preprocessed decoder parameters for each slot of the downlink transmission.

11. A method for wireless communications at a network device, comprising:
receiving, from a user equipment (UE), one or more sounding reference signals for an uplink channel;
measuring one or more first channel state parameters of the one or more sounding reference signals;
decoding one or more uplink transmissions received from the UE;
determining, using one or more signal processing operations and based at least in part on one or more preprocessed decoder parameters associated with a decoder of the network device, one or more adjustment values for the one or more first channel state parameters, the one or more preprocessed decoder parameters being based at least in part on decoding the one or more uplink transmissions; and
transmitting, to the UE, the one or more adjustment values for the one or more first channel state parameters.

12. The method of claim 11, wherein transmitting the one or more adjustment values comprises transmitting one or more second channel state parameters associated with the one or more sounding reference signals, the one or more second channel state parameters comprising the one or more adjustment values, the method further comprising:
receiving, from the UE, one or more uplink data transmissions based at least in part on the one or more second channel state parameters.

13. The method of claim 11, wherein determining the one or more adjustment values comprises: determining, using a first signal processing operation, that the one or more first channel state parameters is adjusted to increase throughput based at least in part on the one or more preprocessed decoder parameters; and determining, using a second signal processing operation, the one or more adjustment values for the one or more first channel state parameters.

14. A method for wireless communication at a user equipment (UE), comprising:
determining one or more channel state parameters associated with one or more reference signals communicated over a channel;
detecting, from a downlink channel decoder of the UE, one or more preprocessed decoder parameters associated with the downlink channel decoder of the UE, the one or more preprocessed decoder parameters being detected based at least in part on communication over the channel; and
transmitting, to a network device, a message comprising an indication of the one or more preprocessed decoder parameters based at least in part on determining the one or more channel state parameters and detecting the one or more preprocessed decoder parameters.

15. The method of claim 14, further comprising determining, using one or more signal processing operations, that the one or more channel state parameters is adjusted to increase throughput based at least in part on the one or more preprocessed decoder parameters, wherein transmitting the message comprises transmitting an indication of the determining.

16. The method of claim 15, wherein determining that the one or more channel state parameters is adjusted comprises using a machine learning operation implemented by a neural network operation to determine that a modulation and coding scheme that is higher than a granted modulation and coding scheme associated with communications over the channel passes a cyclic redundancy check.

17. The method of claim 15, wherein transmitting the indication of the determining comprises transmitting a quantized report that includes a negative acknowledgement or a positive acknowledgement.

18. The method of claim 14, wherein:
the one or more reference signals comprise one or more channel state information reference signals, the method further comprising receiving, from the network device, the one or more channel state information reference signals, and
determining one or more channel state parameters is based at least in part on receiving the one or more channel state information reference signals and measuring the one or more channel state information reference signals.

19. The method of claim 14, wherein:
the one or more reference signals comprise one or more sounding reference signals, the method further comprising transmitting, to the network device, the one or more sounding reference signals, and
determining one or more channel state parameters is based at least in part on transmitting the one or more sounding reference signals.

20. The method of claim 14, wherein transmitting the indication of the one or more preprocessed decoder parameters comprises transmitting the one or more preprocessed decoder parameters comprising one or more statistical values of one or more decoder metrics.

21. A method for wireless communications at a network device, comprising:
determining one or more channel state parameters associated with one or more reference signals communicated over a channel;
receiving, from a user equipment (UE), a message comprising an indication of one or more preprocessed decoder parameters associated with a downlink channel decoder of the UE, the one or more preprocessed decoder parameters being based at least in part on communication over the channel;
determining, based at least in part on the indication of the one or more preprocessed decoder parameters, one or more adjustment values associated with the one or more channel state parameters, wherein determining the one or more adjustment values comprises:
determining, using a first machine learning operation, that the one or more channel state parameters is adjusted to increase throughput based at least in part on the one or more preprocessed decoder parameters; and
determining, using a second machine learning operation, the one or more adjustment values associated with the one or more channel state parameters; and transmitting, to the UE, a downlink transmission based at least in part on the one or more adjustment values associated with the one or more channel state parameters.

22. The method of claim 21, wherein:

determining the one or more adjustment values associated with the one or more channel state parameters comprises using one or more signal processing operations, and the downlink transmission is based at least in part on one or more second channel state parameters for the one or more reference signals, the one or more second channel state parameters comprising the one or more adjustment values associated with the one or more channel state parameters.

23. The method of claim 21, wherein determining that the one or more channel state parameters is adjusted comprises using a machine learning operation implemented by a neural network operation to determine that a modulation and coding scheme that is higher than a granted modulation and coding scheme associated with communications over the channel passes a cyclic redundancy check.

24. The method of claim 21, wherein determining the one or more adjustment values comprises using a machine learning operation implemented by an online iterative process to calculate one or more expected spectral efficiency values for one or more respective modulation and coding schemes associated with communications over the channel.

25. The method of claim 24, wherein:

determining the one or more adjustment values comprises setting a target spectrum efficiency based at least in part on the one or more respective modulation and coding schemes, and the one or more respective modulation and coding schemes comprise a granted modulation and coding scheme, a modulation and coding scheme that is higher than the granted modulation and coding scheme, and a modulation and coding scheme that is lower than the granted modulation and coding scheme.

26. The method of claim 21, wherein:

the one or more reference signals comprise one or more channel state information reference signals, the method further comprising transmitting, to the UE, the one or more channel state information reference signals, and determining one or more channel state parameters is based at least in part on transmitting the one or more channel state information reference signals.

27. The method of claim 21, wherein:

the one or more reference signals comprise one or more sounding reference signals, the method further comprising receiving, from the UE, the one or more sounding reference signals, and determining one or more channel state parameters is based at least in part on receiving the one or more sounding reference signals and measuring the one or more sounding reference signals.

28. The method of claim 21, wherein receiving the message comprising an indication of the one or more preprocessed decoder parameters comprises receiving the one or more preprocessed decoder parameters comprising one or more statistical values of one or more decoder metrics.

* * * * *